United States Patent
Tomita et al.

(10) Patent No.: US 9,473,879 B2
(45) Date of Patent: Oct. 18, 2016

(54) PORTABLE DEVICE AND VEHICLE CONTROL SYSTEM

(71) Applicants: Yosuke Tomita, Aichi (JP); Takahiro Inaguma, Aichi (JP); Tetsuo Nishidai, Aichi (JP)

(72) Inventors: Yosuke Tomita, Aichi (JP); Takahiro Inaguma, Aichi (JP); Tetsuo Nishidai, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 4 days.

(21) Appl. No.: 14/667,000

(22) Filed: Mar. 24, 2015

(65) Prior Publication Data

US 2015/0281423 A1  Oct. 1, 2015

(30) Foreign Application Priority Data

Mar. 27, 2014 (JP) .................. 2014-065583

(51) Int. Cl.
*H04M 3/00* (2006.01)
*H04W 4/00* (2009.01)
*H04M 1/725* (2006.01)

(52) U.S. Cl.
CPC ......... *H04W 4/008* (2013.01); *H04M 1/72533* (2013.01)

(58) Field of Classification Search
CPC ........... H04W 88/02; H04M 2250/02; H04M 1/72533; H04M 1/7253
See application file for complete search history.

(56) References Cited

U.S. PATENT DOCUMENTS

| | | | |
|---|---|---|---|
| 6,657,536 B1* | 12/2003 | Avenel | G07C 9/00111 340/5.61 |
| 2004/0174246 A1 | 9/2004 | Mitchell | |
| 2006/0006984 A1* | 1/2006 | Takahashi | B60R 25/24 340/5.61 |
| 2009/0160639 A1* | 6/2009 | Chu | B60R 25/24 340/539.11 |
| 2013/0035042 A1* | 2/2013 | Matsumoto | H04W 88/04 455/66.1 |

FOREIGN PATENT DOCUMENTS

| | | |
|---|---|---|
| JP | 2009-278597 A | 11/2009 |
| JP | 2010-220084 A | 9/2010 |
| JP | 2013-032648 A | 2/2013 |

* cited by examiner

*Primary Examiner* — Shantell L Heiber
(74) *Attorney, Agent, or Firm* — Osha Liang LLP

(57) ABSTRACT

A control system includes a portable device transmitting to a proximity control signal controlling locking/unlocking of an opening/closing body of the vehicle from near the vehicle, and a remote control signal controlling an engine remotely, intensity of the remote control signal higher than the proximity control signal, and a control device receiving a signal transmitted by the portable device. The portable device transmits by a same transmission antenna the whole of the proximity control signal at a single center frequency, and all of divided signals obtained by dividing the whole of the remote control signal into plural pieces at plural center frequencies. The control device receives by a same reception antenna the whole of the proximity control signal at the single center frequency, and all of the divided signals at center frequencies corresponding to frequencies used upon transmission of the divided signals by the portable device.

6 Claims, 19 Drawing Sheets

PORTABLE DEVICE AND VEHICLE CONTROL SYSTEM

CROSS-REFERENCE TO RELATED APPLICATION

This application is based on Japanese Patent Application No. 2014-065583 filed with the Japan Patent Office on Mar. 27, 2014, the entire contents of which are incorporated herein by reference.

FIELD

The disclosure relates to a portable device, and a vehicle control system that uses the portable device.

BACKGROUND

Conventionally, transmission/reception of signals for remote engine start, signals for keyless entry, and signals for passive functions between a portable device and a vehicle has been widely known. The remote engine start here is a function of starting or stopping the engine of a vehicle at a relatively remote location by operation of a portable device by a user. Also, the keyless entry is a function of performing control such as locking or unlocking of a door or the like (an opening/closing body) of a vehicle at a relatively close location by operation of a portable device by a user. Furthermore, the passive functions refer to a function of locking or unlocking a door when a user operates a door handle, a door knob switch or the like without operating a portable device, and a function of starting/stopping the engine when a user operates a push start switch or the like inside a vehicle without operating a portable device.

For example, JP 2010-220084 A discloses a transmission radio wave modulation method switching system having its aim to improve the reliability of communication establishment when a communication terminal and its communication counterpart perform wireless communication. According to this transmission radio wave modulation method switching system, as a communication method between a vehicle and an electronic key, FM modulation that is more immune to noise is selected in a case of a smart operation, a wireless locking/unlocking operation and the like, and AM modulation that reaches farther is selected in a case of a remote engine start operation and the like. Also, when an operation button for AM output is operated by long press, the modulation method is forcibly switched from the AM modulation used until then to the FM modulation, and wireless communication is performed.

Also, US 2004/0174246 A1 discloses a door opening system for a vehicle including a portable device that transmits a plurality of wireless frequencies, and a similarly coded wireless receiver. The decoding cycle of the receiver is varied depending on the channel, the frequency range, and the format of signals, but is a cycle of 2.5 seconds when using frequencies from 900 to 902.3 MHz for signals of multiple wireless frequencies. Reception of a first valid signal with respect to transmission of signals from the portable device is taken as the start, and reception is continued during the cycle time. All the signals received during the cycle are interpreted as one transmission.

Furthermore, JP 2009-278597 A discloses a multi-channel communication system whose electric power consumption required for wireless communication is reduced and wireless communication is carried out in a short time. This multi-channel communication system includes an electronic key capable of transmitting radio waves through a plurality of channels, and an in-vehicle communication control device capable of receiving radio waves transmitted from the electronic key by performing a polling operation at a predetermined cycle. After successively transmitting a plurality of first channel frames through a first channel, the electronic key successively transmits a plurality of second channel frames through a second channel of a frequency different from that of the first channel so as to carry out wireless communication even under a noise environment where reception of the radio wave of the first channel is interrupted. A dummy of a time length is added to the data contained in each second channel frame to extend the frame length of the second channel frame.

Furthermore, JP 2013-032648 A discloses a wireless communication system having its aim to keep, with respect to a smart system, the radio wave intensity of a request signal from an in-vehicle system to a portable device within a desired range, and also, to expand the coverage area of the request signal without deteriorating the noise tolerance. In this wireless communication system, a spread data signal is generated by performing spread modulation on predetermined LF data by a spread spectrum method that spreads a data signal into a wide frequency range by multiplication with a spread code, and the spread data signal is converted and amplified to a modulation signal in the LF wave band, and a request signal is transmitted to the portable device using the LF wave band.

In the case of transmitting a command signal to an in-vehicle ECU (Electronic Control Unit) from a portable device provided with the remote engine start function, the keyless entry, and the passive function, operations from a location far away from the vehicle (for example, several hundreds of meters to one kilometer) is prohibited with respect to the keyless entry and the passive function from the standpoint of security, and unlocking of the door is allowed only from a short distance away (several meters to several tens of meters). Accordingly, the portable device transmits the command signal with low transmission intensity that would reach a more or less short distance.

In contrast, with respect to the remote engine start function, the engine of a vehicle is, from the standpoint of convenience of the user, allowed to be started or stopped from a location far away from the vehicle. In this case, the command signal is transmitted at high transmission intensity that would reach the vehicle from a faraway position.

Regarding wireless communication by radio wave between a portable device and a vehicle, the radio wave frequency, intensity, transmission time and the like that are allowed are different depending on the regulations of each country or region. For example, in Japan and the U.S., a frequency of 900 MHz may be used for communication with respect to communication between a portable device and an in-vehicle ECU.

Under the regulations in both Japan and the U.S., regarding low transmission intensity such as that used by the keyless entry or the passive function, the portable device may perform signal transmission at a predetermined frequency using time enough to transmit one piece of transmission data contained in a command signal.

However, in the case of performing transmission at high transmission intensity such as that used by the remote engine start function, the regulations are different between Japan and the U.S. In Japan, the command signal has to be transmitted only after confirming that there is no radio wave at the same frequency in the surroundings. Then, if there is no radio wave at the same frequency in the surroundings, a signal with high transmission intensity may be transmitted with time enough to just transmit all of one piece of transmission data contained in a command signal for the remote engine start function.

On the other hand, in the U.S., there is no need to check the presence/absence of a radio wave at the same frequency in the surroundings. However, the time when transmission is possible is determined according to the transmission intensity, and in the case of transmitting at high transmission intensity such as that used by the remote engine start function, the time when transmission is possible is extremely short compared to Japan. Thus, it is not possible to transmit all of one piece of transmission data contained in the command signal for the remote engine start function.

Also, in the case of the remote engine start function, no inconvenience is caused to the user even if the response time (the time between complete start or stop of the engine to reception by the portable device of a notice regarding the completion) is a little slow. On the other hand, in the case of the keyless entry function or the passive function, if the response time is slow and the door locking/unlocking operation is delayed, a user may be dissatisfied.

SUMMARY

Accordingly, one or more embodiments of the disclosure provide a portable device capable of transmitting a command signal for causing a vehicle to perform the remote engine start function, the keyless entry and the passive function, and a vehicle control system using the portable device. The portable device complies with the regulations of each country by the same structure, is capable of operations of starting/stopping the engine from a relatively far distance in the remote engine start function, and whose response time regarding a door locking/unlocking operation or the like in the keyless entry function or the passive function is short.

To solve the problem described above, a control system is provided, the control system including a portable device configured to transmit to a vehicle a proximity control signal for controlling locking/unlocking of an opening/closing body of the vehicle from near the vehicle, and a remote control signal for controlling an engine of the vehicle from a far distance, intensity of the remote control signal being higher than that of the proximity control signal, and a control device provided to the vehicle and configured to receive a signal that is transmitted by the portable device, where the portable device transmits by a same transmission antenna a whole of the proximity control signal at a single center frequency, and all of divided signals obtained by dividing a whole of the remote control signal into a plurality of pieces at a plurality of center frequencies, and where the control device receives by a same reception antenna the whole of the proximity control signal at the single center frequency, and all of the divided signals at center frequencies corresponding to frequencies used at times of transmission of the divided signals by the portable device.

According to the above, the remote engine start function and the keyless entry and the passive function may be integrated into the same frequency band by transmitting, at a single frequency, signals for the keyless entry and the passive function, which perform communication at a relatively short distance, and by transmitting a command signal for the remote engine start function, which performs communication at a relatively far distance, by using a plurality of center frequencies and by performing frequency hopping, and also, the regulations in each country may be complied with by the same structure. Moreover, according to the above, an engine start/stop operation may be performed from a far distance by the remote engine start function, and also, the response time for a door locking/unlocking operation or the like by the keyless entry function or the passive function which requires a certain degree of readiness is not slowed.

Furthermore, the portable device may perform transmission with the single center frequency for transmitting the proximity control signal and a center frequency for transmitting a first divided signal of the remote control signal being a same frequency, and the control device may wait for reception at the single center frequency, determine, based on content of a received signal, whether the received signal is the proximity control signal or the first divided signal of the remote control signal, and in a case where the received signal is the first divided signal of the remote control signal, perform reception by switching to a center frequency corresponding to a frequency used at a time of transmission of the divided signal by the portable device.

According to the above, since reception standby is performed at only one frequency, the power consumption of the vehicle may be suppressed.

Still further, the portable device may transmit the proximity control signal at the single center frequency, and all of the divided signals of the remote control signal at the plurality of center frequencies including a center frequency that is same as the single center frequency and a different center frequency, and the control device may wait for reception at frequencies used only for the single center frequency and the plurality of center frequencies, and in a case where a frequency of a received signal is a same frequency as a frequency used only for the plurality of center frequencies, perform reception by switching to a center frequency corresponding to a frequency used at a time of transmission of the divided signal by the portable device without determining, based on content of the received signal, whether the received signal is the proximity control signal or a first divided signal of the remote control signal, and in a case where the frequency of the received signal is a same frequency as the single center frequency, determine, based on content of the received signal, whether the received signal is the proximity control signal or the first divided signal of the remote control signal, and if the received signal is the first divided signal of the remote control signal, perform reception by switching to the center frequency corresponding to the frequency used at the time of transmission of the divided signal by the portable device.

According to the above, the probability of receiving the remote control signal is increased.

Moreover, the portable device may perform transmission with the single center frequency for transmitting the proximity control signal and center frequencies for transmitting all of a plurality of the divided signals of the remote control signal being different frequencies, and the control device may wait for reception at the single center frequency and a center frequency used for transmission of a divided signal of the remote control signal by the portable device, and in a case where a frequency of a received signal is same as a center frequency for transmitting a divided signal of the remote control signal, perform reception by switching to a center frequency corresponding to a frequency used at a time of transmission of the divided signal by the portable device without determining, based on content of the received signal, whether the received signal is the proximity control signal or a first divided signal of the remote control signal.

According to the above, the probability of receiving the remote control signal is increased.

To solve the problem described above, there is provided a portable device configured to transmit, to a vehicle, a proximity control signal for controlling locking/unlocking of an opening/closing body of the vehicle from near the vehicle, and a remote control signal for controlling an engine of the vehicle from a far distance, intensity of the remote control signal being higher than that of the proximity control signal, and which is configured to transmit by a same transmission antenna a whole of the proximity control signal at a single center frequency, and all of divided signals obtained by dividing a whole of the remote control signal into a plurality of pieces at a plurality of center frequencies.

According to the above, the remote engine start function and the keyless entry and the passive function may be integrated into the same frequency band by transmitting, at a single frequency, signals for the keyless entry and the passive function, which perform communication at a relatively short distance, and by transmitting a command signal for the remote engine start function, which performs communication at a relatively far distance, by using a plurality of center frequencies and by performing frequency hopping, and also, the regulations in each country may be complied with by the same structure. Moreover, according to the above, an engine start/stop operation may be performed from a far distance by the remote engine start function, and also, the response time for a door locking/unlocking operation or the like by the keyless entry function or the passive function which requires a certain degree of readiness is not slowed.

To solve the problem described above, there is provided a control system including a portable device configured to transmit to a vehicle a proximity control signal for controlling the vehicle from near the vehicle, and a remote control signal for controlling the vehicle from a far distance, intensity of the remote control signal being higher than that of the proximity control signal, and a control device provided to the vehicle and configured to receive a signal that is transmitted by the portable device, where the portable device transmits by a same transmission antenna a whole of the proximity control signal at a single center frequency, and all of divided signals obtained by dividing a whole of the remote control signal into a plurality of pieces at a plurality of center frequencies, and where the control device receives by a same reception antenna the whole of the proximity control signal at the single center frequency, and all of the divided signals at center frequencies corresponding to frequencies used at times of transmission of the divided signals by the portable device.

According to the above, a remote turn-on function for an air conditioner and the keyless entry and the passive function may be integrated into the same frequency band by transmitting, at a single frequency, signals for the keyless entry and the passive function, which perform communication at a relatively short distance, and by transmitting a command signal for the remote turn-on function for an air conditioner, which performs communication at a relatively far distance, by using a plurality of center frequencies and by performing frequency hopping, and also, the regulations in each country may be complied with by the same structure. Moreover, according to the above, a start/stop operation for an air conditioner may be performed from a far distance by the remote turn-on function for an air conditioner, and also, the response time for a door locking/unlocking operation or the like by the keyless entry function or the passive function which requires a certain degree of readiness is not slowed.

As described above, according to one ore more embodiments of the disclosure, a portable device capable of transmitting a command signal for causing a vehicle to perform the remote engine start function, the keyless entry and the passive function, and a vehicle control system using the portable device may be provided, where the portable device complies with the regulations in each country by the same structure, is capable of operations of starting/stopping the engine from a relatively far distance in the remote engine start function, and whose response time regarding a door locking/unlocking operation or the like in the keyless entry function or the passive function is short, and where the vehicle control system uses the portable device.

DETAILED DESCRIPTION

Hereinafter, embodiments of the disclosure will be described with reference to the drawings. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figure 19:
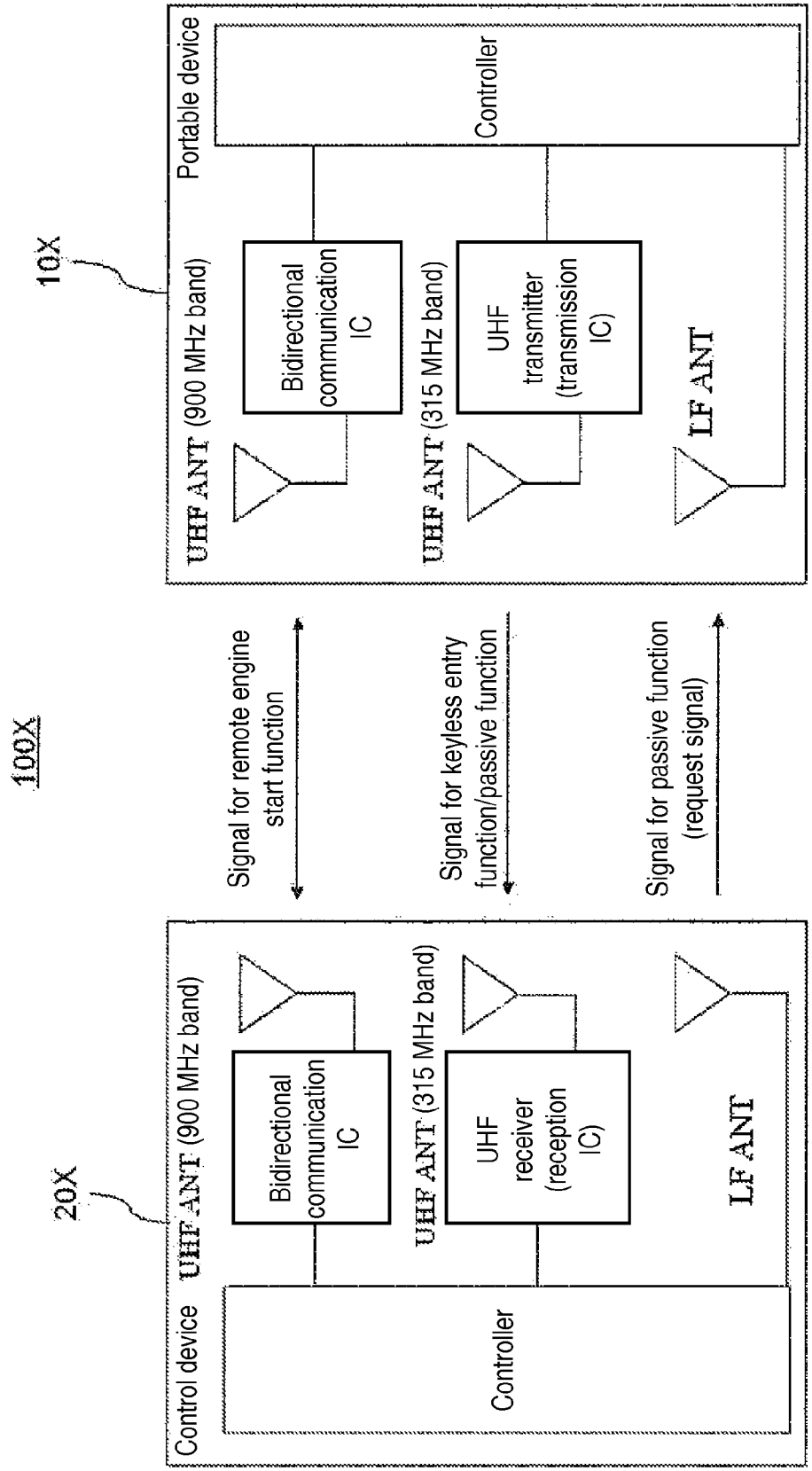
FIG. 19 is a block diagram of a control system according to a conventional technique.

First, before describing the embodiments according to the disclosure, a vehicle control system 100X according to a conventional technique will be described with reference to FIG. 19. The control system 100X includes a control device 20X that is mounted in a vehicle, and a portable device 10X for performing wireless communication with the control device 20X.

The portable device 10X includes an antenna and a bidirectional communication IC (Integrated Circuit) for transmitting/receiving a command signal for a remote engine start function by a UHF (Ultra High Frequency) wave in 900 MHz band, an antenna and a UHF transmitter (a transmission IC) for transmitting a command signal for a keyless entry function and a response signal for a passive function by a UHF wave in 315 MHz band, an antenna for receiving a response request signal for the passive function from a vehicle by a radio wave in an LF (Low Frequency) band, and a controller for controlling these antennas and ICs.

To be compatible with the portable device 10X described above, the control device 20X includes an antenna and a bidirectional communication IC for transmitting/receiving a command signal for the remote engine start function by the UHF wave in 900 MHz band, an antenna and a UHF receiver (a reception IC) for receiving a command signal for the keyless entry function and a response signal for the passive function by the UHF wave in 315 MHz band, an antenna for transmitting a response request signal for the passive function to the portable device by an LF wave, and a controller for controlling these antennas and ICs.

With the keyless entry function of opening/closing the door or the like of a vehicle by operation of the portable device by a user, operation from a location relatively far away, for example, several hundreds of meters to one kilometer, from the vehicle, is prohibited from the standpoint of security, and the function works only at a relatively short distance of about several meters to 100 meters. Also, with the passive function of locking/unlocking the door when the door handle or the like is operated by a user carrying the portable device or of performing authentication of the portable device and starting/stopping the engine when a push start switch or the like is operated in the vehicle, in addition to the standpoint of security, the user is supposed to be in the vicinity of the vehicle in the first place, and thus, the function works only at a short distance.

On the other hand, with the remote engine start function, the engine of a vehicle is allowed to be started/stopped from a location relatively far away from the vehicle, from the standpoint of convenience of the user. Due to these aspects, with the control system 100X of a conventional technique, an antenna and the like for transmitting/receiving a command signal for the keyless entry function and a response signal for the passive function and an antenna and the like for transmitting/receiving a command signal for the remote engine start function are separately provided, and different frequencies are transmitted/received so as to match their respective properties.

<First Embodiment>

Figure 1:
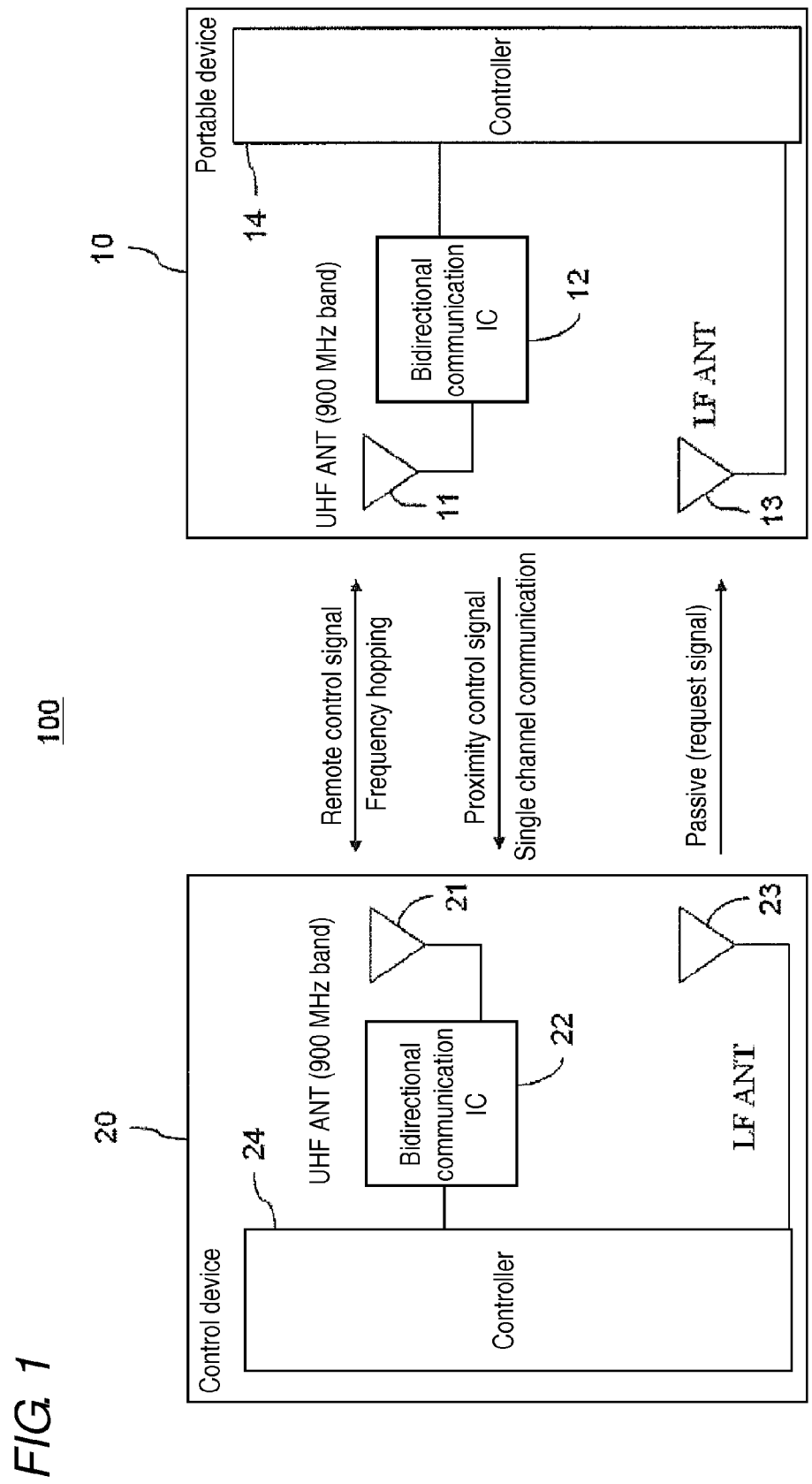
FIG. 1 is a block diagram of a control system of a first embodiment according to the disclosure.

First, referring to FIG. 1, a control system 100 of a first embodiment will be described in comparison with the control system 100X according to a conventional technique. The control system 100 includes a control device 20 that is mounted in a vehicle, and a portable device 10 for performing wireless communication with the control device 20. The portable device 10 includes an antenna 11 and a bidirectional communication IC 12 for transmitting/receiving a UHF wave in 900 MHz band, an antenna 13 for receiving an LF wave by which a response request signal for the passive function is received from the vehicle, and a controller 14 for controlling these antennas (11 and 13) and the bidirectional communication IC 12. The antenna 11 and the bidirectional communication IC 12 transmit/receive a UHF wave in 900 MHz band for transmitting/receiving, when the vehicle in which the control device 20 is mounted and the portable device 10 are at relatively spaced apart positions, a command signal for the remote engine start function (a remote control signal), and for transmitting, when the two are at relatively close positions, signals for the keyless entry function and the passive function (proximity control signals).

To be compatible with the portable device 10 described above, the control device 20 includes an antenna 21 and a bidirectional communication IC 22 for transmitting/receiving a UHF wave in 900 MHz band, an antenna 23 for transmitting a response request signal for the passive function to the portable device 10 by a radio wave in an LF band, and a controller 24 for controlling these antennas (21 and 23) and the bidirectional communication IC 22. The antenna 21 and the bidirectional communication IC 22 transmit/receive a UHF wave in 900 MHz band for transmitting/receiving a command signal for the remote engine start function, which is the remote control signal, and for transmitting signals for the keyless entry function and the passive function, which are the proximity control signals.

With the control system 100X according to a conventional technique, the antenna and the like for transmitting/receiving a command signal for the remote engine start function and the antenna and the like for transmitting signals for the keyless entry function and the passive function are separately provided. However, with the control system 100, the antenna and the like for transmitting/receiving the remote control signal as the command signal for the remote engine start function and the antenna and the like for transmitting the proximity control signal as the command signal for the keyless entry function or the response signal for the passive function are integrated. That is, with both the portable device 10 and the control device 20, the remote control signal for the remote engine start function and the proximity control signals for the keyless entry function and the passive function are both transmitted/received via the same antenna (11 or 21).

According to the control system 100, the remote control signal for the remote engine start function is transmitted from the transmission side (mainly, the portable device 10) by having the entire command signal regarding the remote engine start function divided into a plurality of pieces across a plurality of center frequencies of the UHF wave in the 900 MHz band. That is, the remote control signal is transmitted on a per-divided-signal basis, the divided signals being obtained by dividing the entire signal into a plurality of pieces, and all the divided signals are transmitted by switching to center frequencies different for successive divided signals (frequency hopping communication). The reception side (mainly, the control device 20) receives the divided signal at a center frequency corresponding to the frequency used at the time of transmission of the divided signal by the portable device 10. Basically, the reception side may restore the command signal for the remote engine start function before division by receiving, in order, all the divided signals transmitted from the transmission side using the same center frequencies as the center frequencies to which switching was performed at the time of transmission. As described, in the case of communication over a long distance for transmitting/receiving a command signal for the remote engine start function, the regulations in the U.S. may be satisfied even at the time of performing transmission/reception at high intensity by performing frequency hopping communication where the command contents are divided and the time of transmission at the same center frequency is short.

On the other hand, the proximity control signal for the keyless entry function or the passive function is transmitted/received at a single center frequency by the same UHF wave in the 900 MHz band (single channel communication). With the proximity control signal, the entire signal regarding the keyless entry function or the passive function is transmitted/received at once. The signal for the keyless entry function or the passive function is premised on communication over a short distance, and it is not necessary to perform division and frequency hopping communication as in the case of the command signal for the remote engine start function. In addition, according to transmission/reception of the signal for the keyless entry function or the passive function, the communication time is made short by performing single channel communication, and the response time is not slowed, and the readiness is not impaired.

Figure 18:
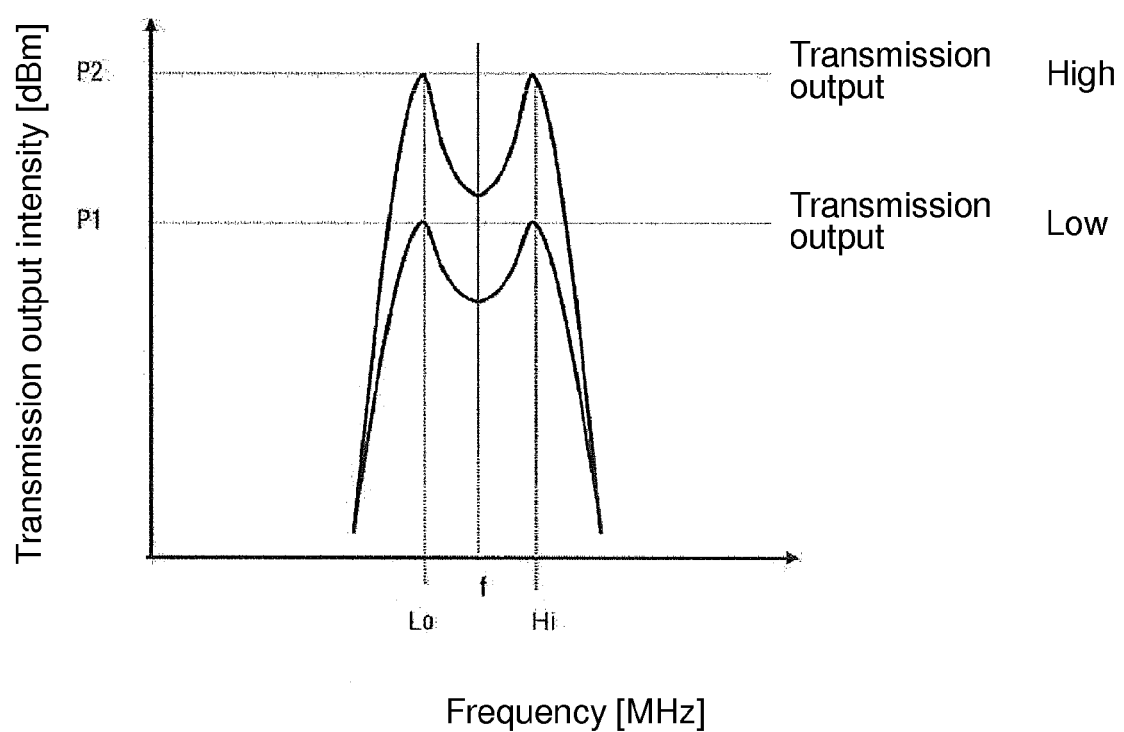
FIG. 18 is an explanatory diagram describing transmission intensity of the portable device of the first embodiment according to the disclosure.

The remote control signal is transmitted at transmission intensity higher than that of the proximity control signal. However, the remote control signal may comply with the regulations in each country by being transmitted using a plurality of center frequencies and by performing frequency hopping, and all of one piece of transmission data contained in the command signal of a remote engine start operation transmitted by the remote control signal may be transmitted. Specifically, as shown in FIG. 18, the portable device 10 outputs, from the antenna 11, low transmission output intensity P1 in the case of transmitting a proximity control signal, and outputs high transmission output intensity P2 in the case of transmitting a remote control signal. In the drawing, the curve whose maximum transmission output intensity is P1 shows the relationship between the frequency used in the case of transmitting the proximity control signal and the transmission output intensity, and the curve whose maximum transmission output intensity is P2 shows the relationship between the frequency used in the case of transmitting the remote control signal and the transmission output intensity. In this drawing, the radio wave transmitted by the portable device 10 indicates that data is transmitted by using a method (FSK (Frequency Shift Keying)) of changing the carrier wave to a low frequency in the case of Lo and to a high frequency in the case of Hi with a certain frequency f as the center, but as will be described later, this is not particularly restrictive.

Figure 2:
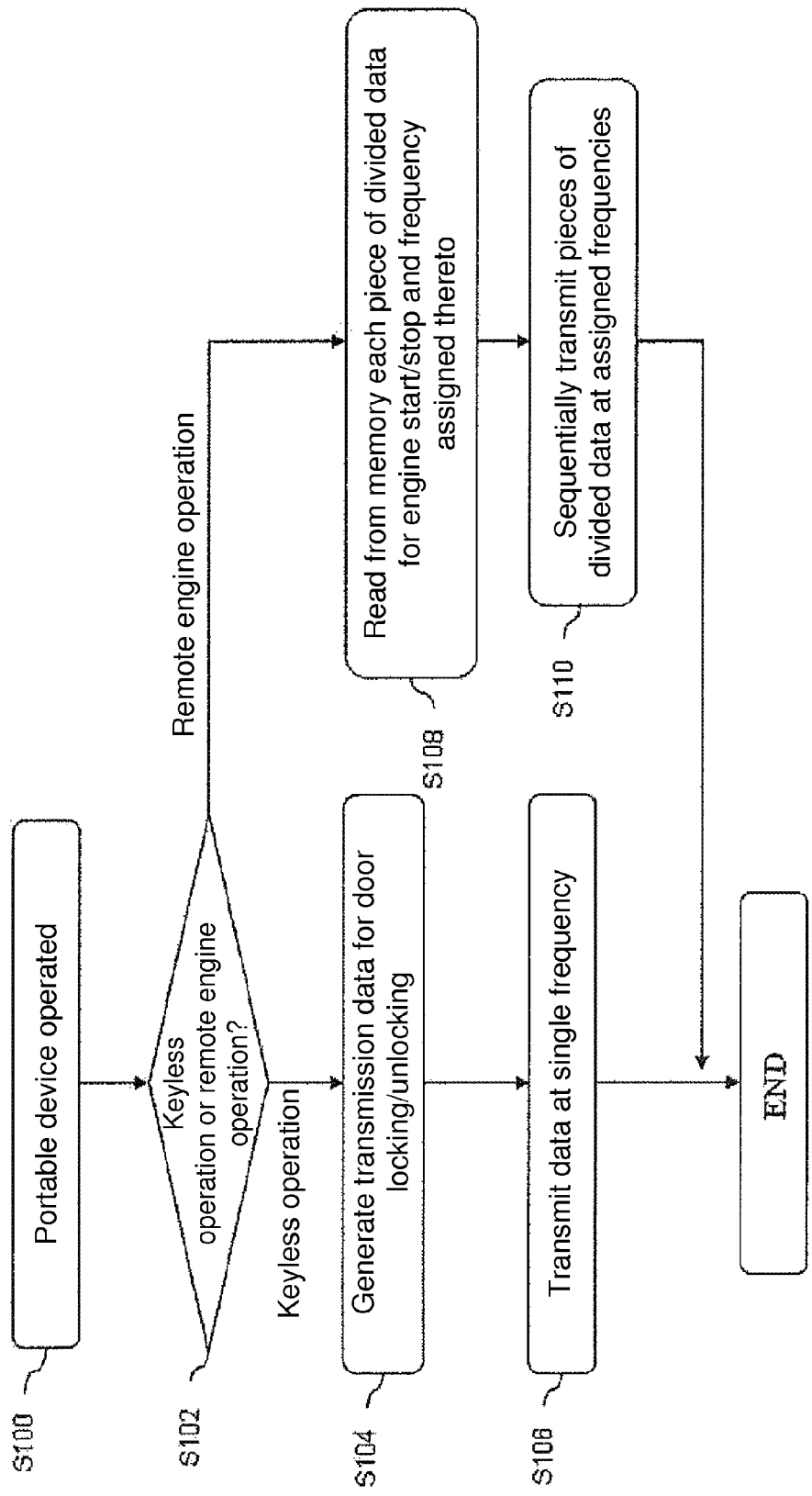
FIG. 2 is a flow chart showing a control step in the case of operation of an operation switch of a portable device of the first embodiment according to the disclosure.

Referring to FIG. 2, a control flow for a case where a user has performed, by the portable device 10, an operation for keyless entry (hereinafter referred to as a keyless operation) or an operation for remote engine start or remote engine stop (hereinafter referred to as a remote engine operation) will be described. The symbol S in the flow chart refers to a step. In S100, a user operates a switch (not shown) provided to the portable device 10 for the keyless operation or the remote engine operation. The controller 14 of the portable device 10 detects operation of this switch, and in S102, checks whether the operation content corresponds to the keyless operation or to the remote engine operation.

In the case where the keyless operation is detected, the controller 14 of the portable device 10 generates transmission data for locking/unlocking of the door of the vehicle in S104. Alternatively, the controller 14 may have the transmission data for locking/unlocking of the door stored in a memory (not shown) provided to the portable device 10, and read the transmission data from the memory. In S106, the portable device 10 converts the transmission data generated (or read) in the previous step into a signal that is to be actually transmitted by the bidirectional communication IC 12, and transmits the signal at a predetermined single center frequency via the antenna 11.

In the case where the switch operated in S100 is for the remote engine operation, the controller 14 reads transmission data for engine start/stop from the memory in S108. The transmission data for engine start/stop is stored as a plurality of pieces of divided data in the memory, and a center frequency assigned to each piece of the divided data is also correspondingly stored. Accordingly, the controller 14 reads, from the memory, respective pieces of divided data for engine start/stop and their corresponding center frequencies. Then, in S110, the controller 14 converts each piece of divided data into a signal that is to be actually transmitted by the bidirectional communication IC 12, and sequentially transmits the signals at their assigned center frequencies via the antenna 11.

Figure 3:
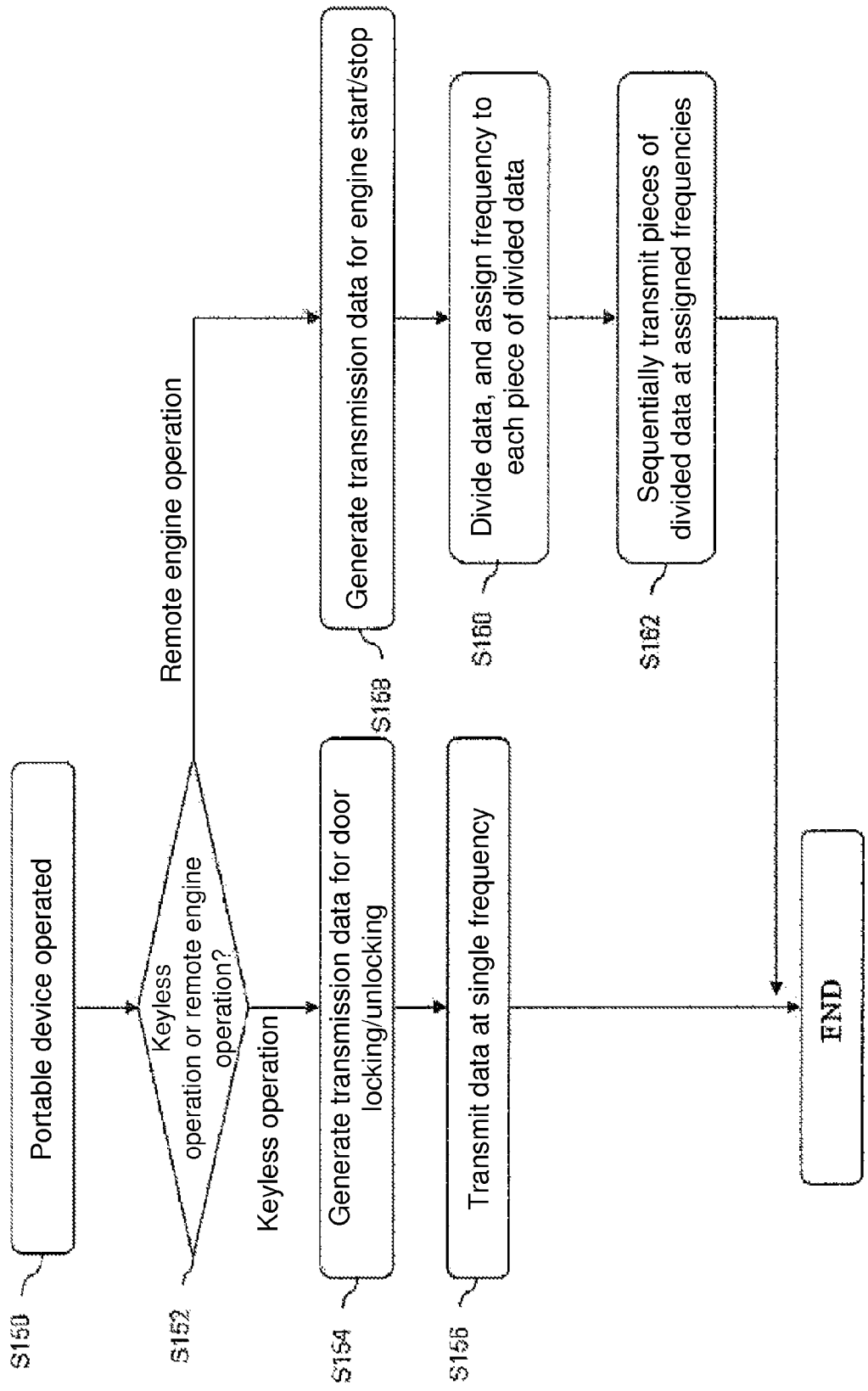
FIG. 3 is a flow chart showing a control step in the case of operation of the operation switch of the portable device of the first embodiment according to the disclosure (a modification 1)

Referring to FIG. 3, a modification of the control flow for a case where a keyless operation or a remote engine operation has been performed by the portable device 10 will be described. To avoid overlapping description, portions different from an illustrative embodiment will be mainly described. S150 to S156 are the same as S100 to S106 described above. In the case where a user operates the switch in S150, the controller 14 checks, in S152, whether the operation content corresponds to the keyless operation or to the remote engine operation.

In the case where the operation content is detected to be the remote engine operation, the controller 14 reads the transmission data for engine start/stop from the memory in S158. The transmission data for engine start/stop is stored in the memory as one whole piece of data. In S160, the controller 14 dynamically divides the one piece of transmission data read in the previous step and generates pieces of divided data, and also, assigns, to each piece of divided data, a frequency that is to be used at the time of transmission of the divided data. Then, in S162, the controller 14 converts the pieces of divided data into signals that are to be actually transmitted by the bidirectional communication IC 12, and sequentially transmits the signals at their assigned center frequencies via the antenna 11.

Figure 4:
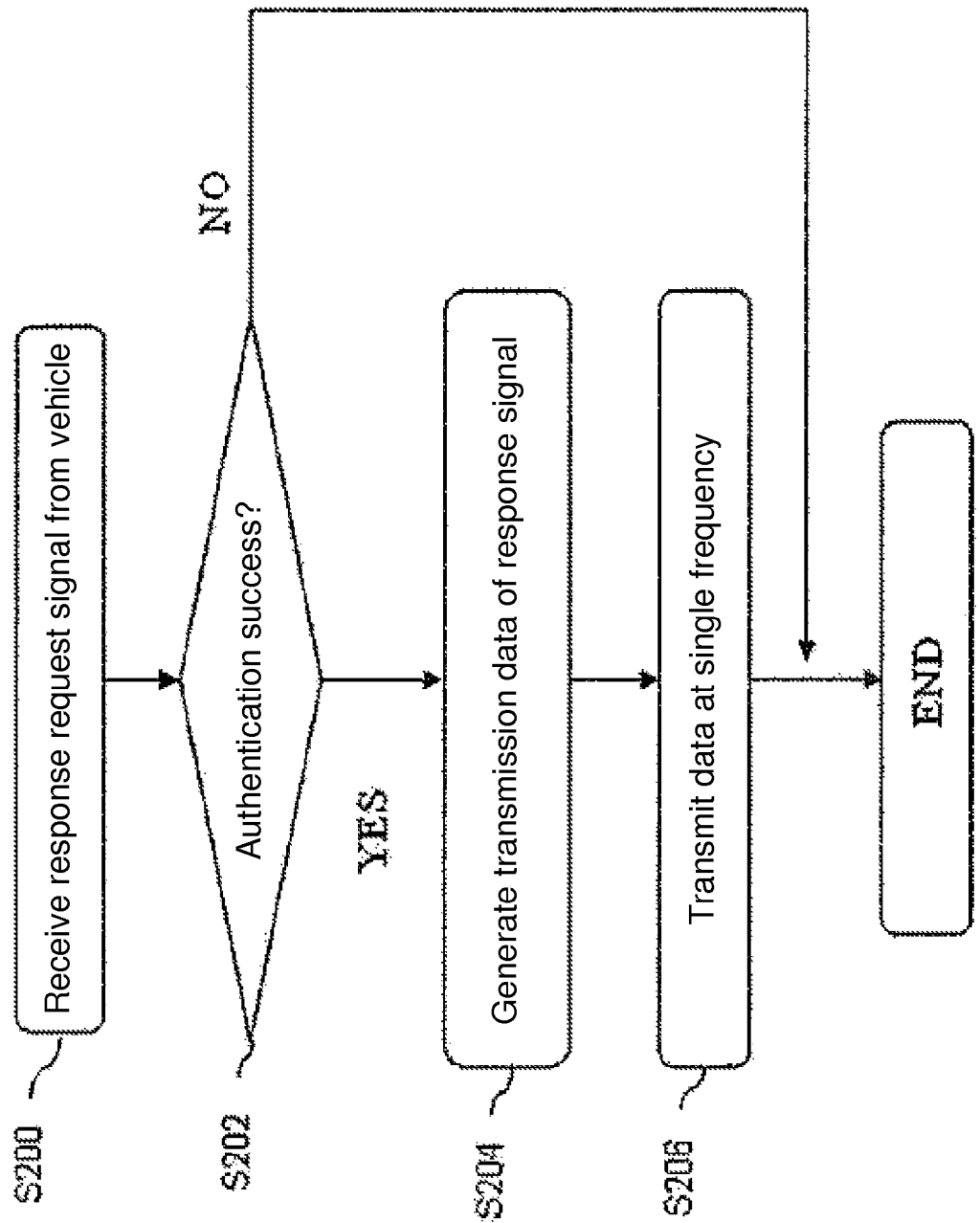
FIG. 4 is a flow chart showing a control step in the case of reception of a response request signal (a passive function) by the portable device of the first embodiment according to the disclosure.

Referring to FIG. 4, the control flow for a case where a response request signal for the passive function is received by the portable device 10 from the antenna 23 of the control device 20 for transmitting an LF wave will be described. When a user operates the door handle, a push start switch or the like, a response request signal is transmitted from the control device 20 to the portable device 10 by an LF wave. Then, in S200, the portable device 10 receives the response request signal via the antenna 13 for receiving an LF wave. In S202, the controller 14 performs authentication check of whether the response request signal is from a legitimate vehicle or not.

In the case where the response request signal is a signal from a legitimate vehicle (in the case where the authentication has succeeded), the controller 14 generates, in S204, transmission data for locking/unlocking of the door of the vehicle or transmission data of a response signal regarding engine start/stop or the like according to the response request signal. Alternatively, the controller 14 may have the transmission data of these response signals stored in the memory, and may read the transmission data from the memory. In S206, the portable device 10 converts the transmission data generated (or read) in the previous step into a signal that is to be actually transmitted by the bidirectional communication IC 12, and transmits the signal at a predetermined single center frequency via the antenna 11.

Figure 5:
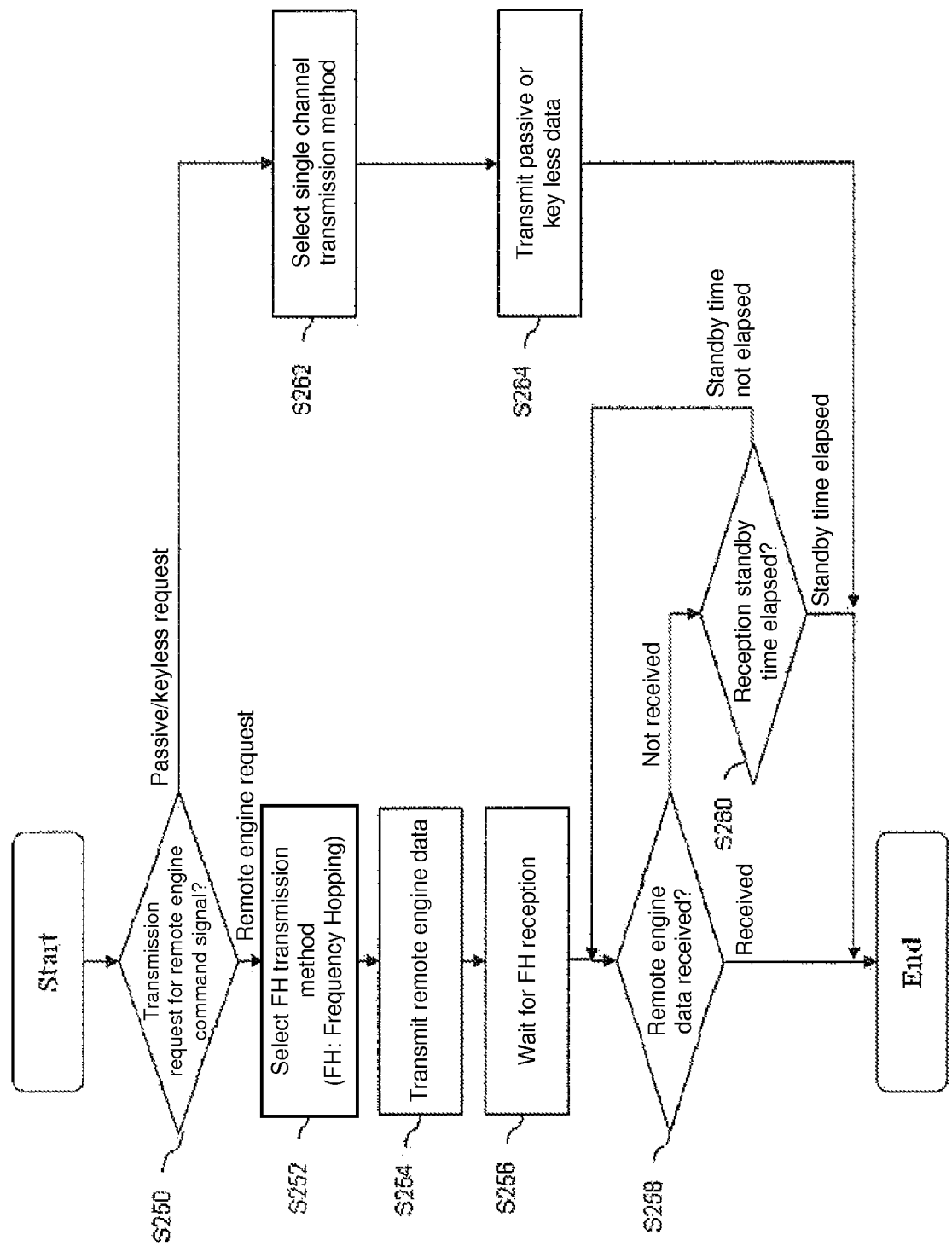
FIG. 5 is a flow chart showing a control step in the case of operation of the operation switch of the portable device of the first embodiment according to the disclosure (a modification 2)

Referring to FIG. 5, a modification of the control flow for a case where a keyless operation (or reception of a response request signal for the passive function) or a remote engine operation is performed by the portable device 10 will be described. In this modification, the controller 14 switches the modulation method of a transmission signal depending on whether the operation is a keyless operation or a remote engine operation. When a user operates a switch or a response request signal for the passive function is received, the controller 14 checks, in S250, whether a command signal for the remote engine function is to be transmitted or not. In the case where a command signal for the remote engine function is to be transmitted, the controller 14 selects, in S252, an FH transmission method (Frequency Hopping) as the modulation method to be used at the time of transmission of the command signal for the remote engine function.

In S254, the portable device 10 transmits the command signals for the remote engine function (remote engine data) while switching the center frequency by the selected FH transmission method. After transmitting all the command signals for the remote engine function, the portable device 10 waits for a response (FH reception) from the control device 20 in S256. The controller 14 of the portable device 10 waits for the response for a predetermined period of time (S258, S260), and ends the process when the response is received or when the predetermined period of time has elapsed.

In the case where a command signal for the remote engine function is not to be transmitted in S250, the controller 14 selects, in S262, a single channel transmission method as the modulation method to be used at the time of transmission of a signal for the keyless function or the passive function. Then, in S264, the portable device 10 transmits all of the corresponding signals, of the command signal for the keyless function and the signal for the passive function, at a predetermined single center frequency.

Now, referring to FIGS. 6 to 9, description will be given on transmission methods for the remote control signal as the command signal for the remote engine function, and the proximity control signal as the command signal for the keyless function or the response signal for the passive function, where the signals are to be transmitted from the portable device 10.

Figure 6:
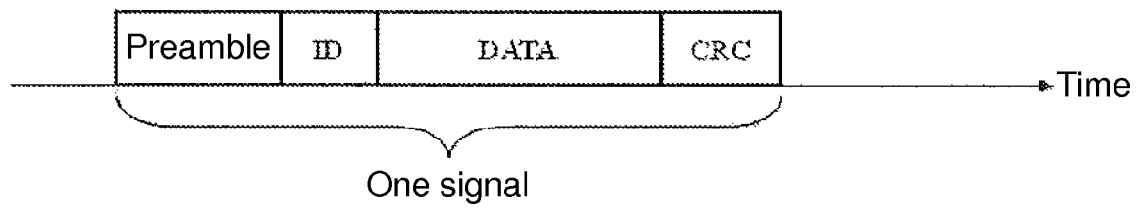
FIG. 6 is an explanatory diagram describing a proximity control signal of the portable device of the first embodiment according to the disclosure.

FIG. 6 shows the structure of a proximity control signal to be the signal for the keyless function or the passive function, which is to be transmitted by the portable device 10. The proximity control signal is configured from a preamble to be transmitted first, an ID of the signal for performing authentication of the portable device 10, DATA of the signal indicating the command content (e. g. door locking/unlocking, engine start/stop) for performing control or the like of the vehicle, and CRC of an error detection signal. The proximity control signal is transmitted at once from the preamble to the CRC as one signal and at a predetermined single center frequency. Additionally, to increase the reliability of transmission, this one signal may be successively transmitted several times. Also, as the predetermined single frequency, one center frequency is set in the range of 915 MHz to 930 MHz in Japan, and 902 MHz to 928 MHz in the U.S., for example.

Figure 7:
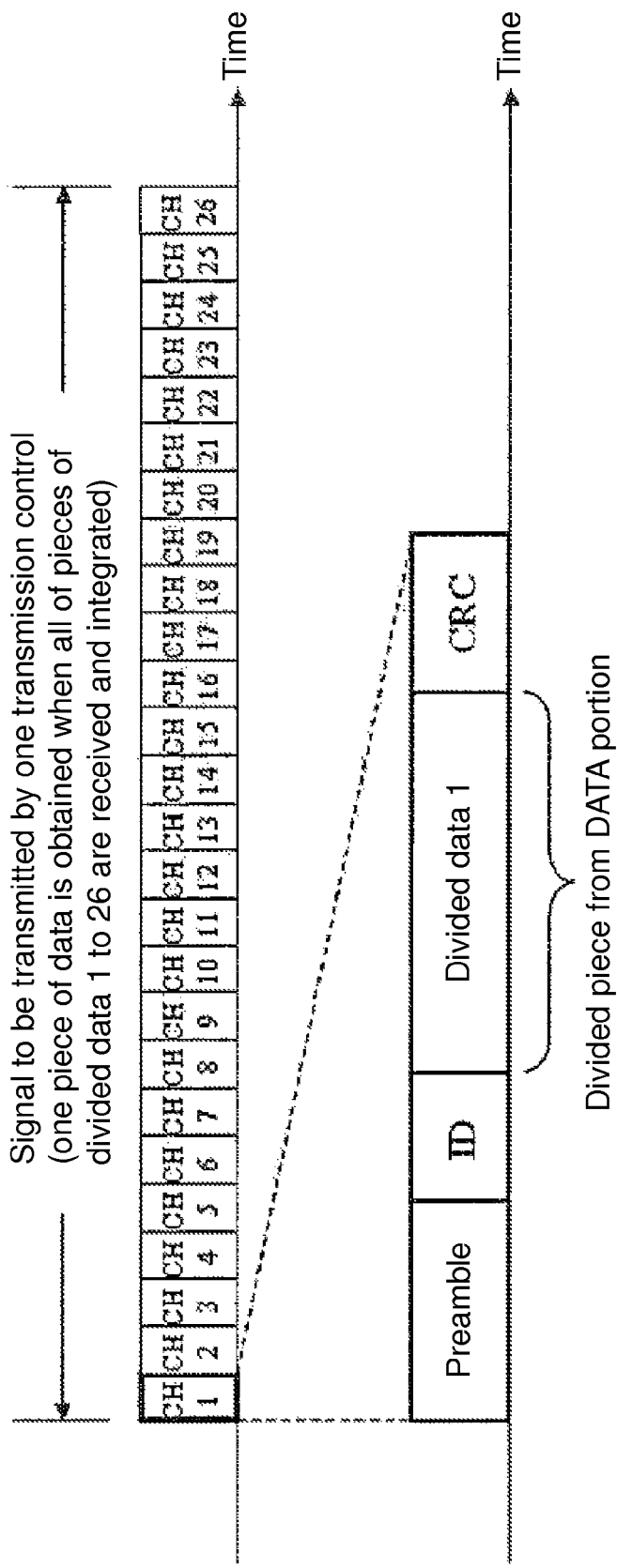
FIG. 7 is an explanatory diagram describing a remote control signal of the portable device of the first embodiment according to the disclosure.

FIG. 7 shows the structure of a remote control signal to be the command signal for the remote engine function, which is to be transmitted by the portable device 10. According to the remote control signal, the part corresponding to the DATA in the proximity control signal is divided into 26 pieces, in this drawing, of divided data. That is, the signal that is to be transmitted at one center frequency is configured from a preamble to be transmitted first, the ID of the signal for performing authentication of the portable device 10, a piece of divided data obtained by dividing a signal (DATA) indicating the command content (engine start/stop, etc.) for performing control or the like of the vehicle, and CRC of an error detection signal. The signal that is to be transmitted at one center frequency includes one piece of data among 26 pieces obtained by dividing the DATA, and transmission is sequentially performed while changing the center frequency from CH1 through CH26 in order according to the FH transmission method. The center frequencies are changed by being appropriately selected from the range of 915 MHz to 930 MHz in Japan, and 902 MHz to 928 MHz in the U.S., for example.

In this manner, according to the FH transmission method, one command signal for the remote engine function is divided into a plurality of pieces (26 in the case shown in the present drawing), and all of the pieces of data obtained by dividing the command signal are sequentially transmitted while changing among a plurality of center frequencies (while changing between CH1 to CH26 in the case shown in the present drawing). The security of communication is increased as the number of pieces of divided data and the number of center frequencies to be changed are increased, and the numbers do not have to coincide. On the reception side, when all the pieces of divided data from 1 to 26 are received and integrated, one DATA may be restored, and the command signal for the remote engine function may be executed. If the content of a command signal is not long enough to be divided into 26 pieces, the controller 14 maintains the specified number of division by appropriately embedding dummy data. Of course, it is needless to say that the number of division is not restricted to 26.

Figure 8:
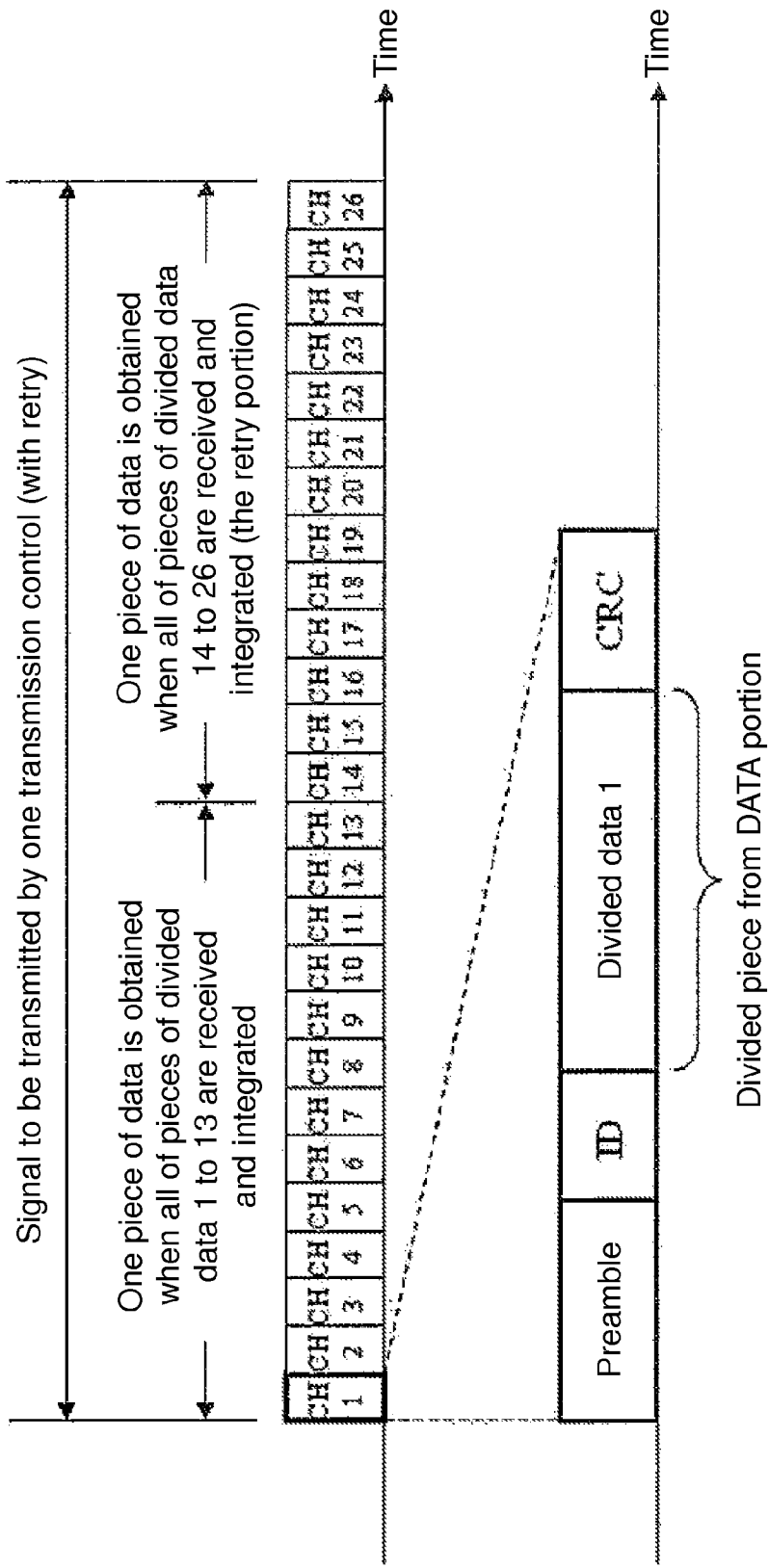
FIG. 8 is an explanatory diagram describing the remote control signal of the portable device of the first embodiment according to the disclosure (a modification)

FIG. 8 shows a modification with respect to FH transmission. In the example of FIG. 7, 26 pieces of divided data obtained by dividing the DATA of a command signal are assigned to 26 center frequencies, and one command signal for the remote engine function is transmitted. In the example shown in the present drawing, 13 pieces of divided data obtained by dividing the DATA of a command signal are assigned to 26 center frequencies, and are transmitted twice. That is, a signal transmitted at one center frequency contains one piece of data among the 13 pieces obtained by dividing the DATA, and transmission is sequentially performed while changing the center frequency from CH1 through CH13 in order according to the FH transmission method. After transmission of the thirteenth divided data, which indicates that all the pieces of divided data have been transmitted, the first to the thirteenth pieces of divided data are again sequentially transmitted while changing the center frequency from CH14 through CH26. By transmitting the same DATA several times (retry) by one signal transmission in the above manner, the probability of receiving the DATA, which is the command content, may be increased.

Figure 9:
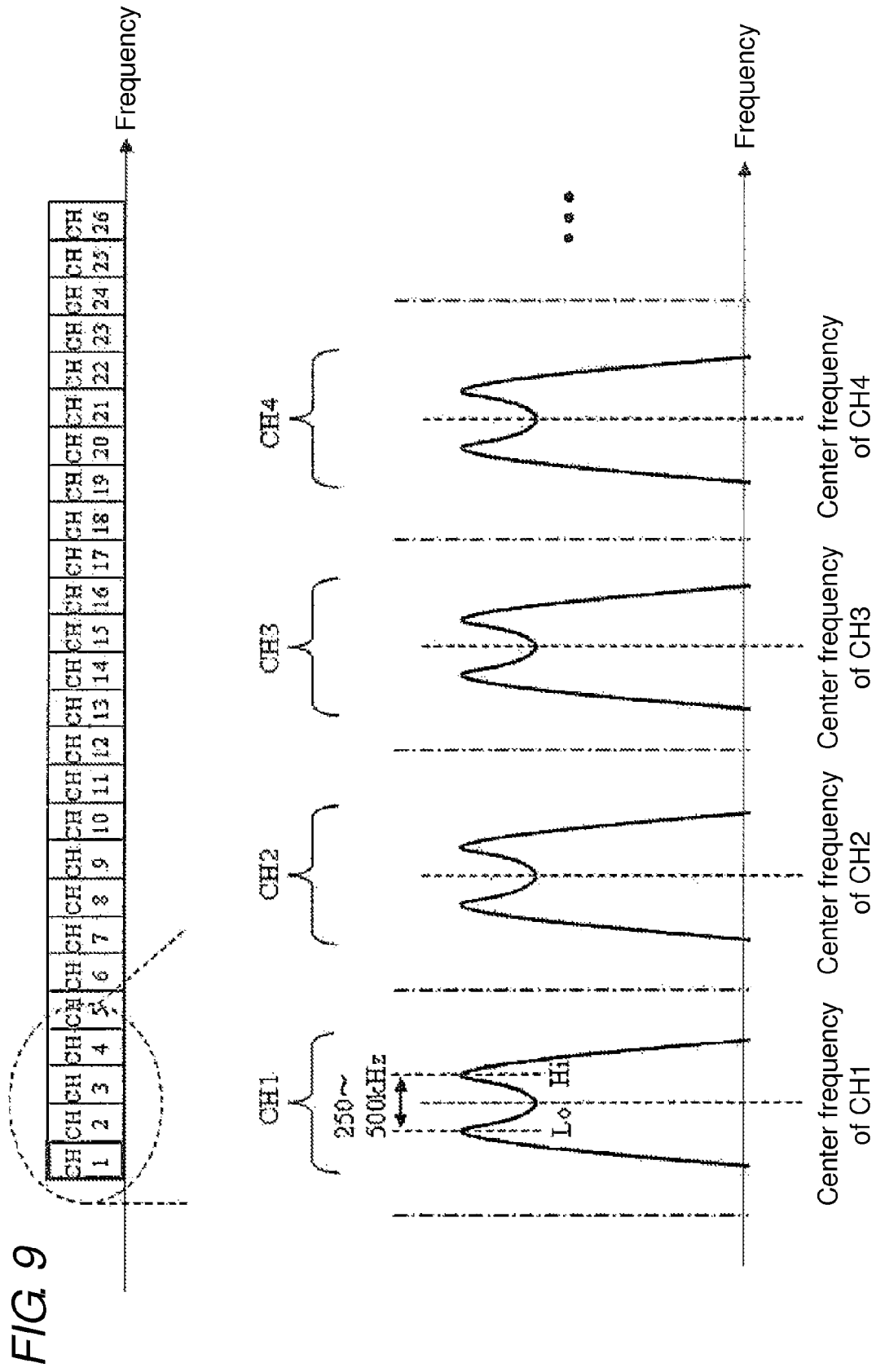
FIG. 9 is an explanatory diagram describing the way of modulating the remote control signal of the portable device of the first embodiment according to the disclosure.

Referring to FIG. 9, the way the center frequency with respect to which a remote control signal for the remote engine function is modulated is changed will be described. As shown in the lower part of the present drawing, when one piece of divided data is transmitted at one center frequency, the radio wave that is actually transmitted by the antenna 11 of the portable device 10, i.e. the data, is transmitted by using a method (FSK (Frequency Shift Keying)) of changing the carrier wave to a low frequency when the data is data indicating Lo (0) and to a high frequency when the data is data indicating Hi (1) with a certain frequency (for example, the center frequency of CH1) as the center. The FSK method is adopted in the first embodiment, but this is not particularly restrictive, and an ASK method (Amplitude Shift Keying) may alternatively be used, for example.

In the example shown in the present drawing, the portable device 10 transmits one piece of divided data in such a way that peak values of Lo and Hi are present with an interval of 250 kHz to 500 kHz around a certain center frequency. In the example shown in the present drawing, after the first divided data is transmitted at the center frequency of CH1, the second divided data is transmitted at the center frequency of CH2 which is a frequency increased (in the drawing, shifted to the right) in such a way that the transmission frequencies do not overlap. Furthermore, after the second divided data is transmitted at the center frequency of the CH2, the third divided data is transmitted at the center frequency of CH3 which is a frequency increased (in the drawing, shifted to the right) in such a way that the transmission frequencies do not overlap. The center frequency does not have to be increased sequentially as in the example shown in the present drawing, and the center frequency may be changed in any order. As described, successive divided signals are sequentially transmitted from the portable device 10 while switching to different center frequencies, and all the divided signals (1 to 26) are transmitted.

Referring to FIGS. 10 to 13, reception standby for the proximity control signal, which is a command signal for the keyless function or a response signal for the passive function, and the remote control signal, which is a command signal for the remote engine function, by the control device 20 will be described.

Figure 10:
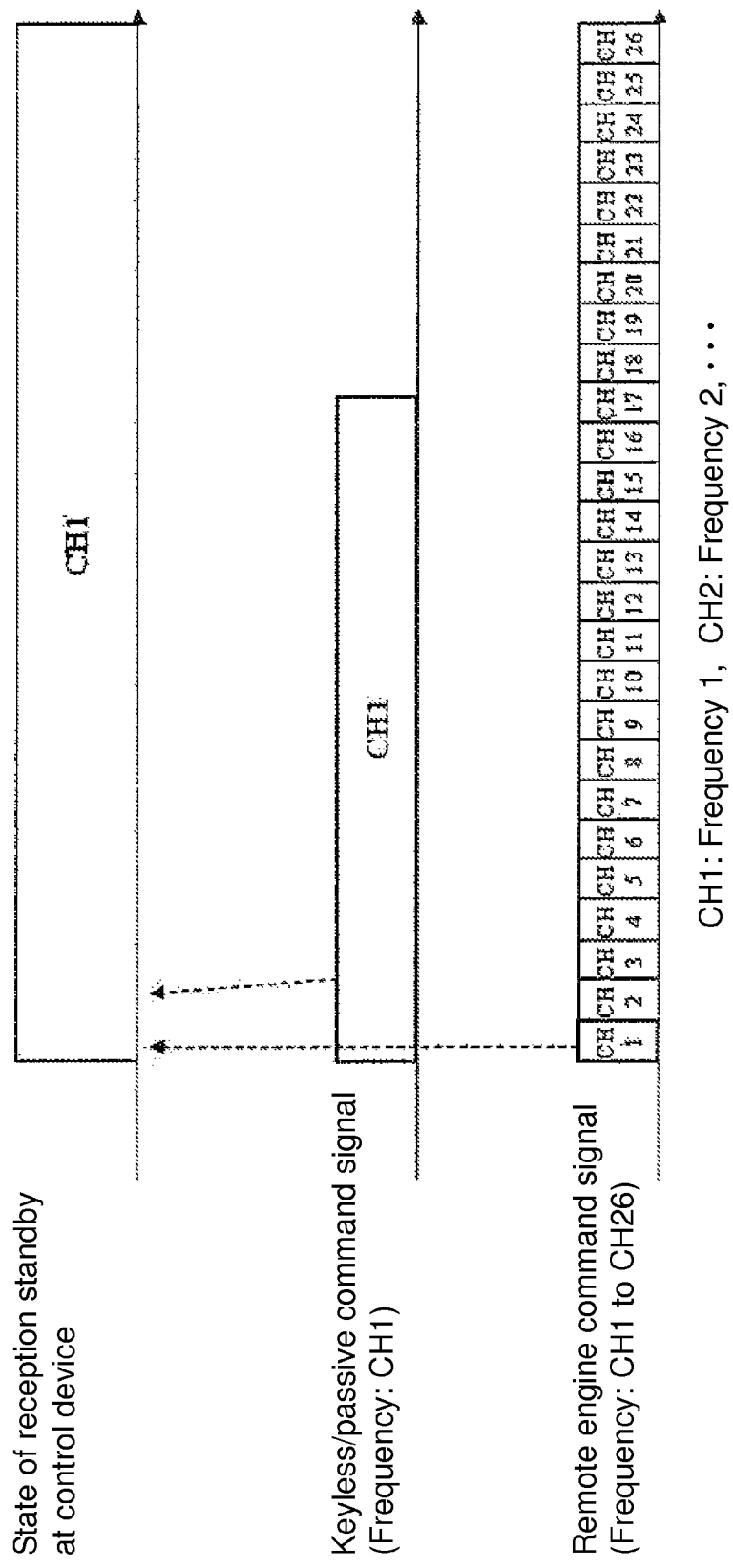
FIG. 10 is an explanatory diagram describing reception standby for the proximity control signal and the remote control signal by a control device of a vehicle of the first embodiment according to the disclosure.

FIG. 10 shows a case where the portable device 10 transmits the proximity control signal for the keyless function or the passive function and the first divided signal of the remote control signal for the remote engine function using the same single center frequency (CH1). In this case, the control device 20 intermittently or continuously waits in reception standby at the same frequency (CH1) as the single center frequency and the center frequency used for the transmission of the first divided signal. In the present drawing, the length of the reception standby is shown as if the wait is continuously performed, but intermittent reception standby where reception standby is performed for a period of time longer than for one transmission signal and then is stopped is more preferable because the power during the wait may be reduced. The length of the reception standby shown in the present drawing is merely conceptual, and in reality, the appropriate length of reception standby and the intermittent cycle are arbitrarily set according to the length of the signal to be transmitted by the portable device 10. When the single center frequency (CH1) for the keyless function or the passive function, or the center frequency (CH1) used for transmitting the first divided signal for the remote engine function is received, the control device 20 starts a reception process. In the case of the first embodiment, the control device 20 does not start the reception process even if a signal is received at a center frequency other than CH1.

Figure 11:
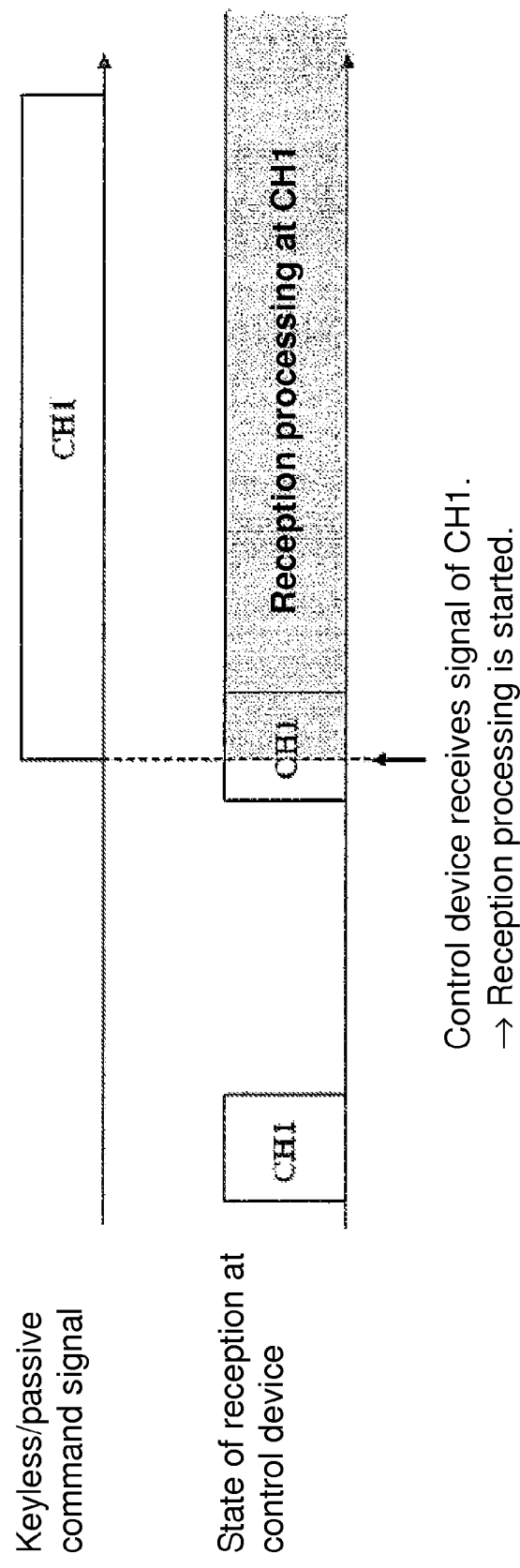
FIG. 11 is an explanatory diagram describing reception standby for the proximity control signal by the control device of a vehicle of the first embodiment according to the disclosure.

Referring to FIG. 11, a case of performing the reception process for the proximity control signal for the keyless function or the passive function will be described. The control device 20 performs reception standby where intermittent reception, at the same frequency (CH1) as the center frequency at which the proximity control signal for the keyless function or the passive function and the first divided signal of the remote control signal for the remote engine function are transmitted, is possible. When a proximity control signal whose center frequency is CH1 is received during the reception standby, the control device 20 analyzes the header portion of the DATA containing the command content or the like of the proximity control signal and determines that the content is that of a command signal for the keyless function or a response signal for the passive function, and shifts from the reception standby state to the reception processing state. As a result, the control device 20 receives all of the proximity control signal at a single center frequency without switching the center frequency to be received. Also, authentication is performed based on the ID of the received proximity control signal, and if authentication succeeds, the command content specified in the DATA is performed in the case of a command signal for the keyless function, and a passive function according to the operation is performed in the case of a response signal for the passive function.

Figure 12:
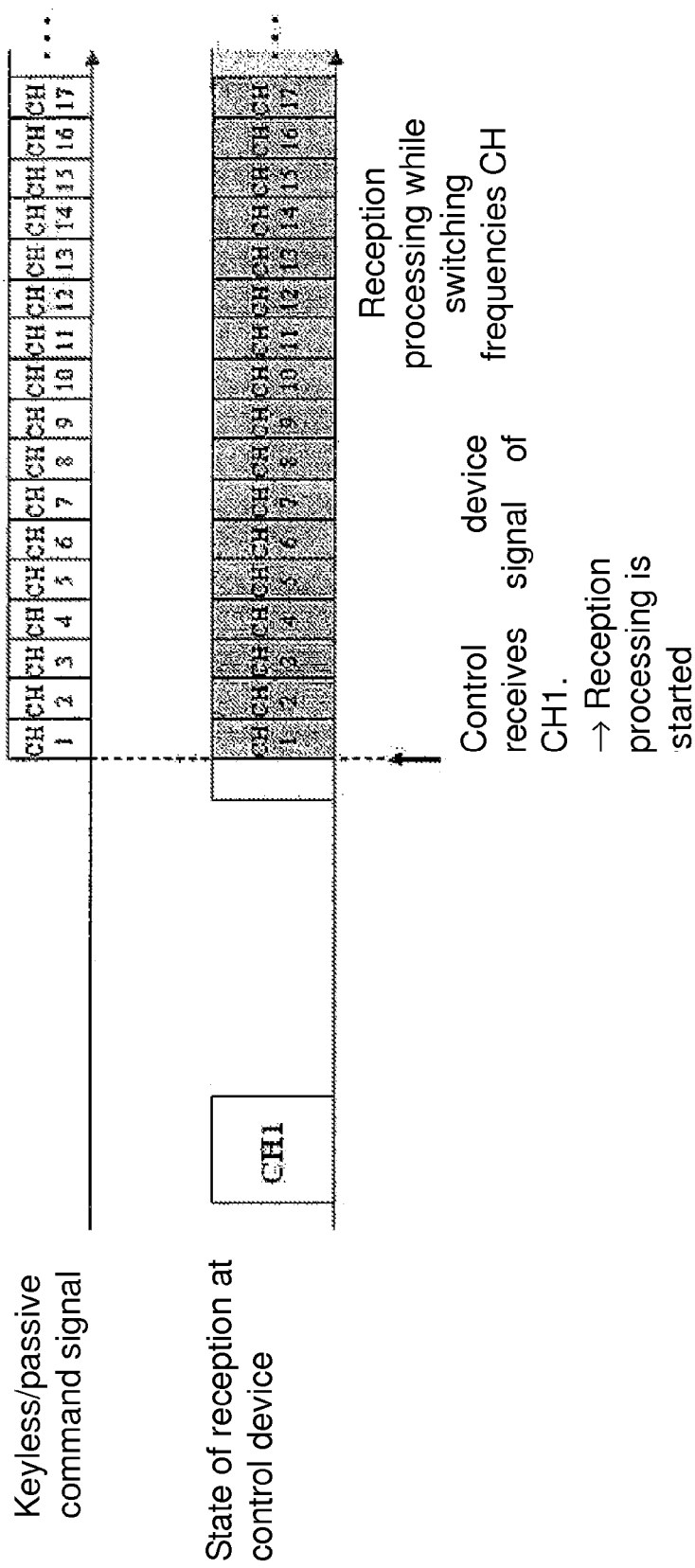
FIG. 12 is an explanatory diagram describing reception standby for the remote control signal by the control device of a vehicle of the first embodiment according to the disclosure.

Referring to FIG. 12, a case of performing the reception process for the remote control signal for the remote engine function will be described. The control device 20 performs reception standby where intermittent reception, at the same frequency (CH1) as the center frequency at which the proximity control signal for the keyless function or the passive function and the first divided signal of the remote control signal for the remote engine function are transmitted, is possible. When the first divided signal of a remote control signal whose center frequency is CH1 is received during the reception standby, the control device 20 analyzes the first divided signal and determines that the signal is a command signal for the remote engine function, and shifts from the reception standby state to the reception processing state. Then, the control device 20 switches the center frequency to be received from CH1 to CH2, and then receives the following divided signals while sequentially switching the center frequency to be received from CH2 through CH26. That is, in the case where a received signal is the first divided signal of a remote control signal, the divided signals are received while switching to center frequencies corresponding to the frequencies used at the time of transmission of the divided signals by the portable device 10. In this manner, since the control device 20 of the first embodiment performs reception standby at only one frequency, the power consumption at the vehicle may be reduced compared to other embodiments described later where the reception standby is performed at several frequencies.

The manner of switching of the center frequency is decided on in advance between the portable device 10 and the control device 20, and the control device 20 receives all the divided signals at center frequencies corresponding to the frequencies used at the time of transmission of the divided signals by the portable device 10. Moreover, one piece of data is generated by combining the received DATA at each of the received frequencies. When authentication and reading of DATA succeed, engine start/stop is performed.

As described above, the portable device 10 transmits the entire proximity control signal, which is a signal for the keyless function or the passive function, at a single center frequency. Also, the portable device 10 transmits all the divided signals obtained by dividing the whole of the remote control signal, which is a command signal for the remote engine function, into a plurality of pieces at a plurality of center frequencies by the same antenna as the antenna which transmits the proximity control signal. The control device 20 receives the entire proximity control signal, which is a signal for the keyless function or the passive function, at the single center frequency. Also, the control device 20 receives the divided signals at center frequencies corresponding to the frequencies used at the time of transmission of the divided signals by the portable device 10, and receives, while switching between the center frequencies, all the divided signals by the same antenna as the antenna which receives the proximity control signal.

According to the above, by transmitting the signals for the keyless entry and the passive function which perform communication over a relatively short distance at a single center frequency, and transmitting the command signal for the remote engine start function which performs communication over a relatively far distance by using a plurality of center frequencies and by performing frequency hopping, the remote engine start function, the keyless entry and the passive function may be put into the same frequency band, and also the regulations of each country may be complied with by the same structure. Also, the engine start/stop operation may be performed by the remote engine start function from a far distance, and also the response time of the door locking/unlocking operation or the like by the keyless entry function or the passive function which requires readiness of a certain degree is not slowed.

Figure 13:
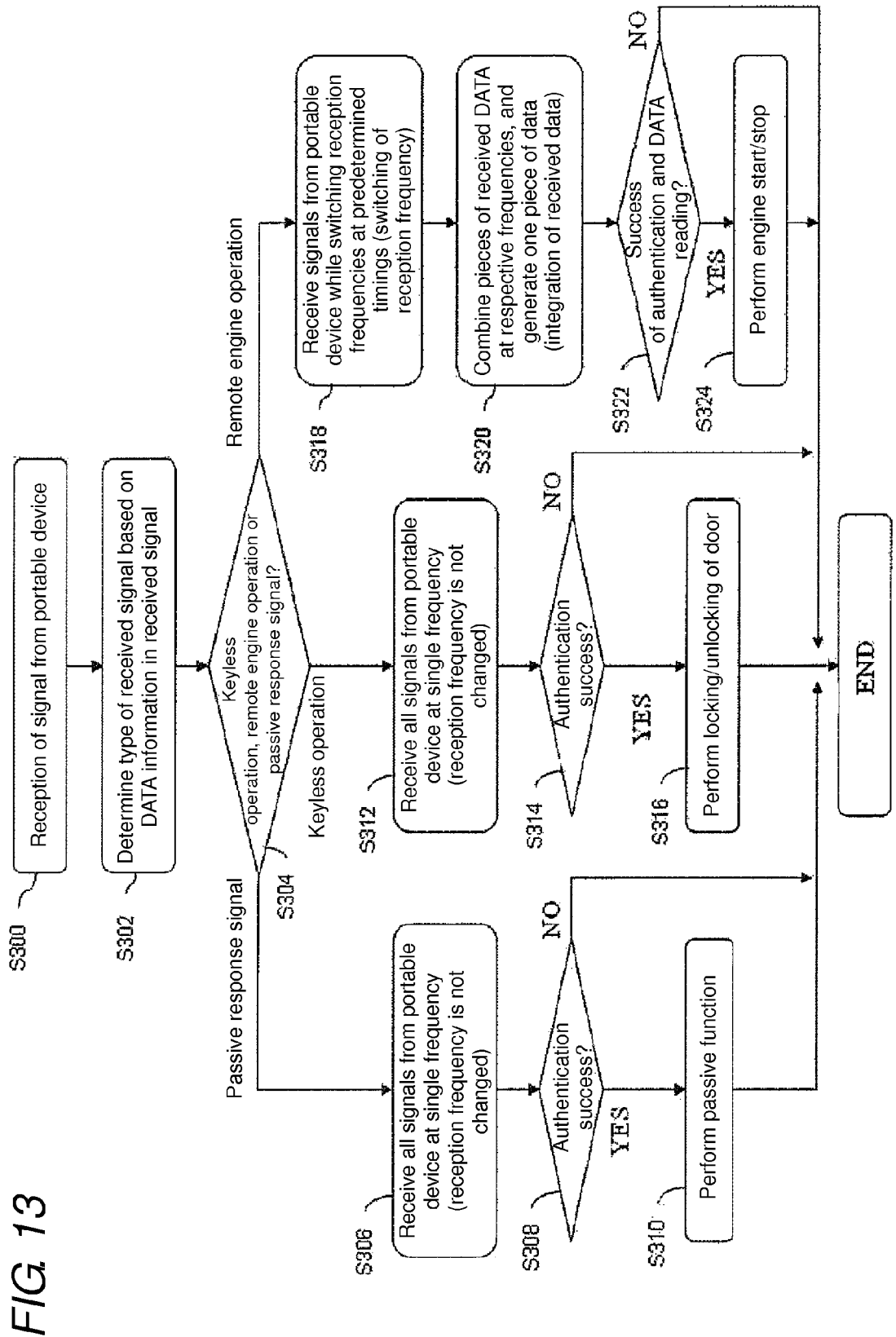
FIG. 13 is a flow chart showing a control step for reception standby by the control device of a vehicle of the first embodiment according to the disclosure.

Referring to FIG. 13, the control step for the reception standby by the control device 20 will be described. In S300, the control device 20 receives from the portable device 10 a proximity control signal for the keyless function or the passive function, or a remote control signal for the remote engine function. The control device 20 analyzes the content information of the DATA portion (including a divided piece of DATA) containing the command content or the like of the signal received in the previous step, and determines in S302 whether the received signal is a proximity control signal indicating the content of a command signal for the keyless function or a response signal for the passive function, or a remote control signal indicating the content of a command signal for the remote engine function.

In the case where the received signal is a response signal for the passive function (S304), the control device 20 receives, in S306, the entire response signal from the portable device at a single center frequency without changing the center frequency to be received. After reception, the control device 20 checks based on the authentication information included in the ID of the received signal in S308. In the case where authentication has succeeded, the control device 20 performs the passive function in S310. To perform the passive function is to perform locking/unlocking when an operation for locking/unlocking the door is identified, such as when an operation of the door handle or the like is detected, or to start/stop the engine when an operation for the engine start/stop is identified, such as when an operation of the push start switch in the vehicle is detected. In the case where authentication has failed, the process is ended without performing anything.

In the case where the received signal is a command signal for the keyless function (S304), the control device 20 receives, in S312, the entire command signal from the portable device at a single center frequency without changing the center frequency to be received. After reception, the control device 20 performs checking based on the authentication information included in the ID of the received signal in S314. In the case where authentication has succeeded, the control device 20 performs locking or unlocking of the door in S316. In the case where authentication has failed, the process is ended without performing anything.

In the case where the received signal is a command signal for the remote engine function (S304), the control device 20 receives, in S318, the signals divided for respective center frequencies from the portable device while switching the center frequency to be received at a predetermined timing. In S320, after reception of all the divided signals, the control device 20 generates one piece of command data by combining and integrating all the divided signals. In S322, the control device 20 checks based on the authentication information included in the ID of the received signal, and also, checks whether all the divided signals have been received and one command content has been restored. In the case where authentication has succeeded, all the divided signals have been received and the original DATA has been restored, the control device 20 performs engine start/stop in S324. In the case where authentication has failed, or not all the divided signals have been received, the process is ended without performing anything.

<Second Embodiment>

Figure 14:
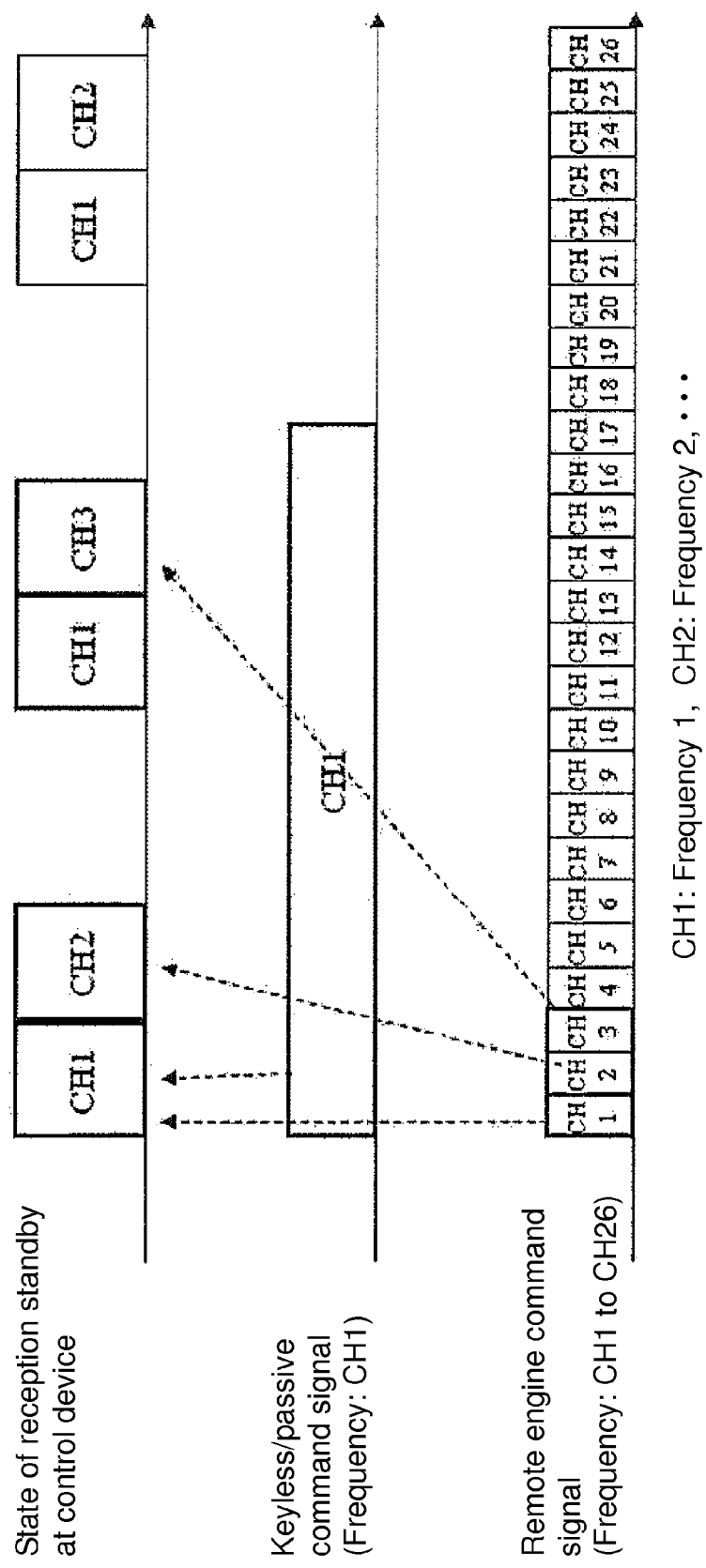
FIG. 14 is an explanatory diagram describing reception standby for a proximity control signal and a remote control signal by a control device of a vehicle of a second embodiment according to the disclosure.
Figure 15:
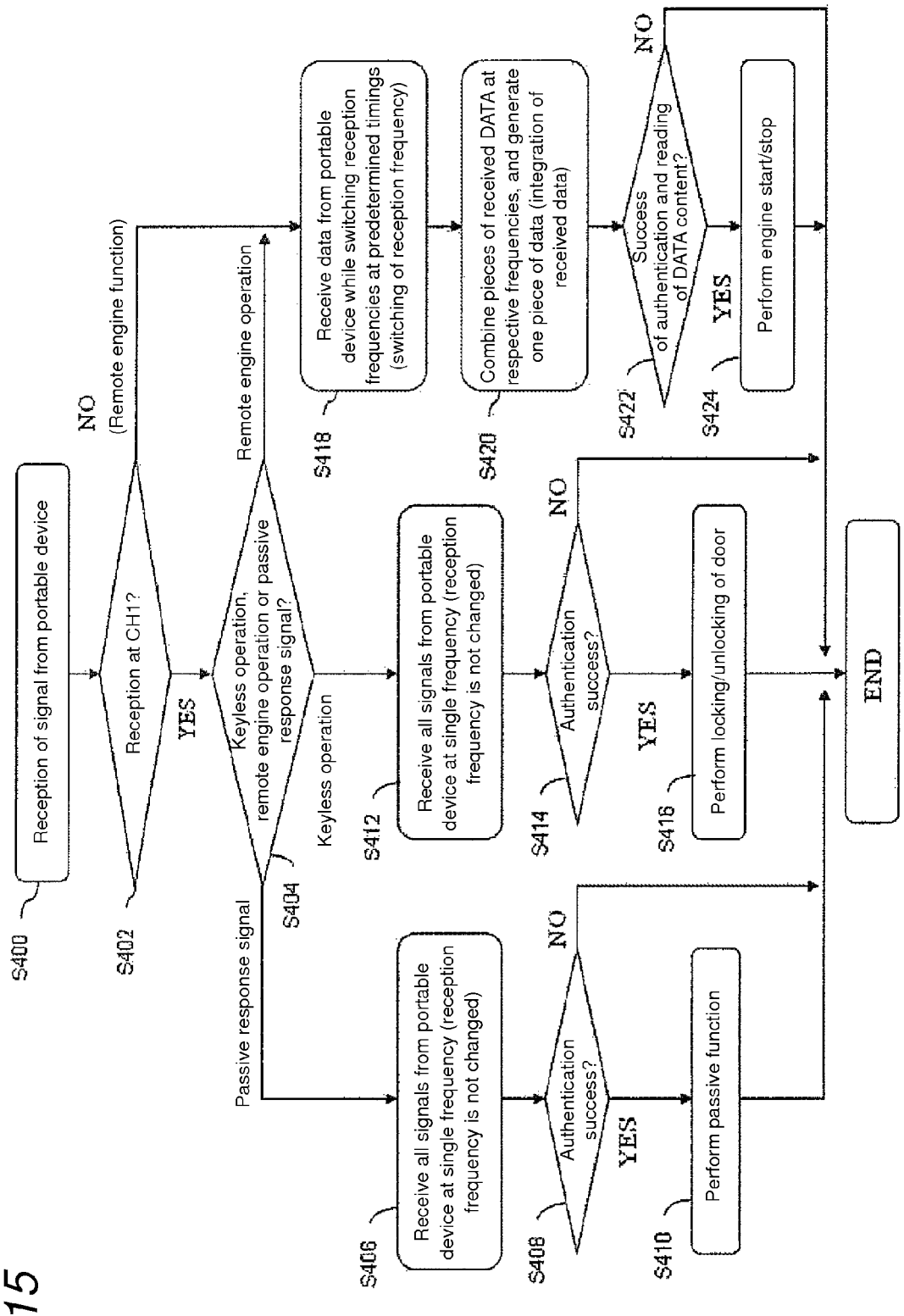
FIG. 15 is a flow chart showing a control step for reception standby by the control device of a vehicle of the second embodiment according to the disclosure.

Referring to FIGS. 14 and 15, a control system 100A of a second embodiment will be described. To avoid overlapping description, aspects different from those of an illustrative embodiment will be mainly described. The structure of the control system 100A is basically the same as that of the control system 100 described above. The control system 100A is different from the control system 100 in that a control device 20A performs reception standby at a plurality of frequencies. The proximity control signal for the keyless function or the passive function and the remote control signal for the remote engine function which are to be transmitted by a portable device 10A are transmitted in the same way as by the portable device 10 described above.

The control device 20A performs reception standby at a single center frequency at which the proximity control signal is to be transmitted, and at a plurality of frequencies at which the remote control signal is to be transmitted. Specifically, in the case of the second embodiment, the control device 20A performs the first reception standby continuously at CH1 which is the single center frequency at which the proximity control signal is to be transmitted and which is the center frequency at which the first divided signal of the remote control signal is to be transmitted, and at CH2 which is a center frequency different from the single center frequency at which the proximity control signal is to be transmitted and which is the center frequency at which the second divided signal of the remote control signal is to be transmitted. Then, following an intermission, the control device 20A performs the second reception standby continuously at CH1, and at CH3 which is a center frequency for transmission of the third divided signal of the remote control signal, CH3 being a center frequency different from the single center frequency at which the proximity control signal is to be transmitted and different from the center frequency CH2 used at the time of transmission of the second divided signal of the remote control signal. Then, following further another intermission, the control device 20A performs the third reception standby continuously at CH1 and CH2 as at the time of the first reception standby. In this manner, the control device 20A performs reception standby for the proximity control signal at the single center frequency (CH1), and performs reception standby for all the divided signals of the remote control signal at a plurality of center frequencies (CH1 to CH26) including the center frequency (CH1) the same as the single center frequency and a different center frequency (CH2, CH3). Moreover, the center frequencies, different from the single center frequency, at which reception standby is to be performed may be only some of the plurality of center frequencies at which the remote control signal is to be transmitted. For example, in the case where the single center frequency is CH1, the frequencies at which the remote control signal is to be transmitted may be CH2 to CH4 among CH1 to CH26.

The control device 20A waits for reception at the single center frequency (CH1) and frequencies (CH2, CH3) used only for the plurality of center frequencies. Then, in the case where a proximity control signal or the first divided signal of a remote control signal is received when the control device 20A is performing reception standby at the frequency CH1, whether the signal is a proximity control signal or the first divided signal of a remote control signal is determined based on the content of a signal received at the same center frequency, and the state is shifted from the reception standby state to the reception processing state. In the case where the received signal is the first divided signal of a remote control signal, the control device 20A switches the center frequency to be received from CH1 to CH2, and then, receives the following divided signals while sequentially switching the center frequency to be received from CH2 through CH26. Also, in the case where the received signal is a proximity control signal, the control device 20A receives all of the proximity control signal at the single center frequency without switching the center frequency to be received.

On the other hand, in the case where the second or the third divided signal of a remote control signal is received when the control device 20A is performing reception standby at the frequency CH2 or CH3, it is apparent that the received signal is a remote control signal and not a proximity control signal, and the state is shifted from the reception standby state to the reception processing state without determination regarding whether the received signal is a proximity control signal or the first divided signal of a remote control signal being performed based on the content of the received signal. Then, the control device 20A receives the following divided signal by switching to the center frequency corresponding to the frequency used at the time of transmission of the divided signal by the portable device. By such reception standby being performed, even if reception of the first divided signal is missed at CH1, for example, reception at CH2 or CH3 is possible, and the probability of receiving the remote control signal is increased. Since the remote control signal is assumed to be transmitted from a far distance, the intensity of the reception signal is possibly low. Accordingly, by increasing the timings when reception is possible, the success probability of reception may be increased.

In the second embodiment, an example is shown where reception standby is alternately performed at CH2 and CH3 following CH1, but various modifications are conceivable. For example, an example where reception standby is alternately performed at the frequencies CH2 and CH3 is described above, but reception standby may be performed with the frequency sequentially changed in the order of CH2, CH3, CH4, and so on. Also, in the description above, reception standby is intermittently performed with sets of two frequencies such as CH1 and CH2, and CH1 and CH3, but reception standby may be intermittently performed with sets of three frequencies such as CH1, CH2 and CH3, CH1, CH4 and CH5, and the like.

Referring to FIG. 15, the control step for the reception standby by the control device 20A will be described. To avoid overlapping description, aspects different from those in FIG. 13 will be mainly described. In S400, the control device 20A receives from the portable device 10A a proximity control signal for the keyless function or the passive function, or a remote control signal for the remote engine function. In S402, the control device 20A checks whether the signal has been received at a center frequency CH1 that is shared between a proximity control signal and a remote control signal. If the result indicates that the signal has been received at other than the shared center frequency CH1, since a proximity control signal is not transmitted at other than the center frequency CH1, the control device 20A determines that the signal is a remote control signal regarding the remote engine function. The following flow (S418 to S424) is the same as that of an illustrative embodiment.

In the case where the signal is received at the shared center frequency CH1, whether it is a proximity control signal or a remote control signal is not clear just by the received center frequency. Thus, as in S302 and S304, the control device 20A determines, in S404, based on the content information of the DATA portion containing the command content or the like of the received signal, whether the received signal is a proximity control signal indicating the content of a command signal for the keyless function or a response signal for the passive function, or a remote control signal indicating the content of a command signal for the remote engine function.

As a result, if the received signal is a proximity control signal regarding a response signal for the passive function, the control device 20A performs S406 to S410 (corresponding to S306 to S310). Also, if the received signal is a proximity control signal regarding a command signal for the keyless function, the control device 20A performs S412 to S416 (corresponding to S312 to S316). Furthermore, if the received signal is a remote control signal regarding a command signal for the remote engine function, the control device 20A performs S418 to S424 (corresponding to S318 to S324). By performing reception standby as described above, the probability of receiving a remote control signal is increased.

<Third Embodiment>

Figure 16:
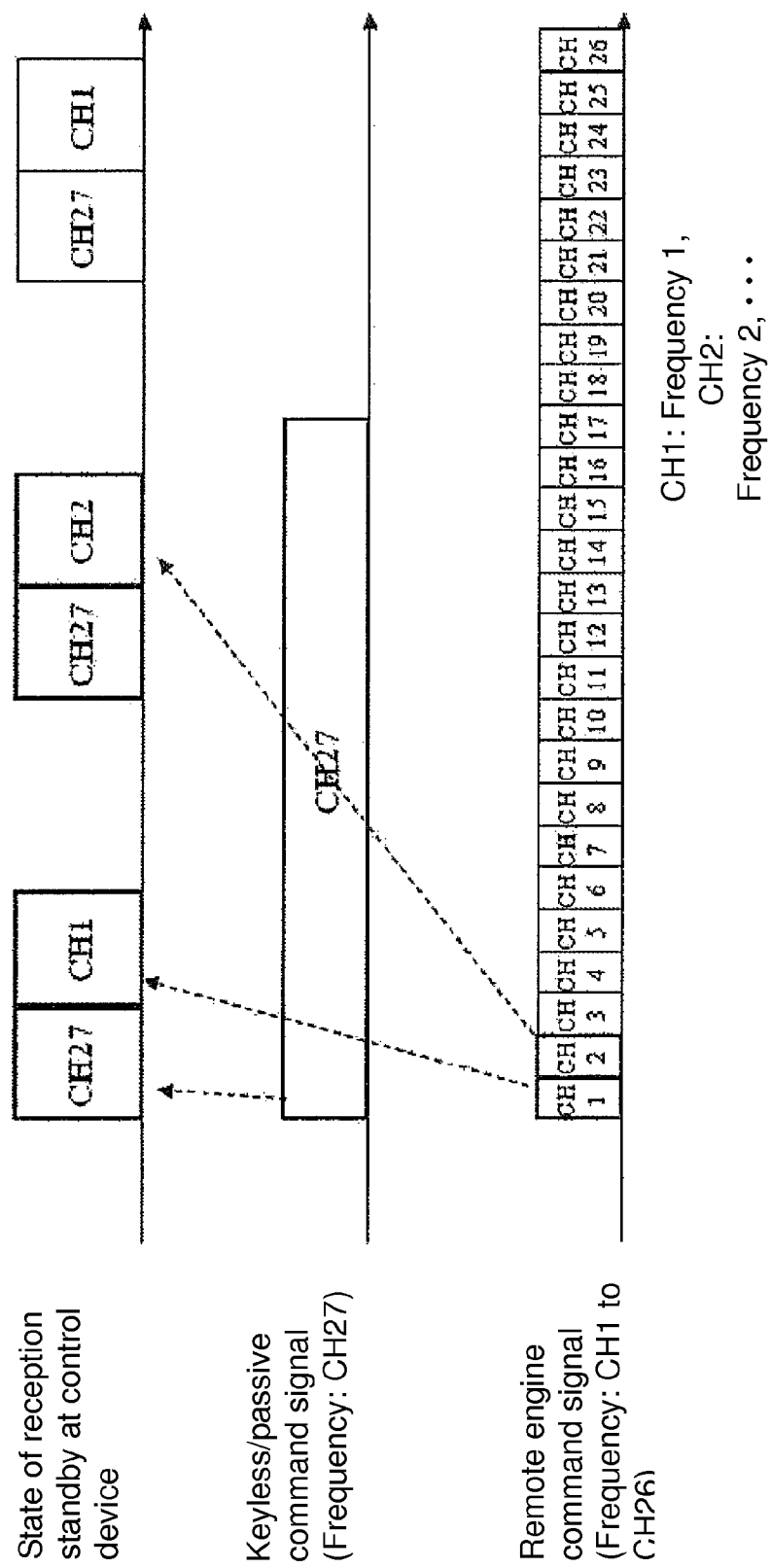
FIG. 16 is an explanatory diagram describing reception standby for a proximity control signal and a remote control signal by a control device of a vehicle of a third embodiment according to the disclosure.
Figure 17:
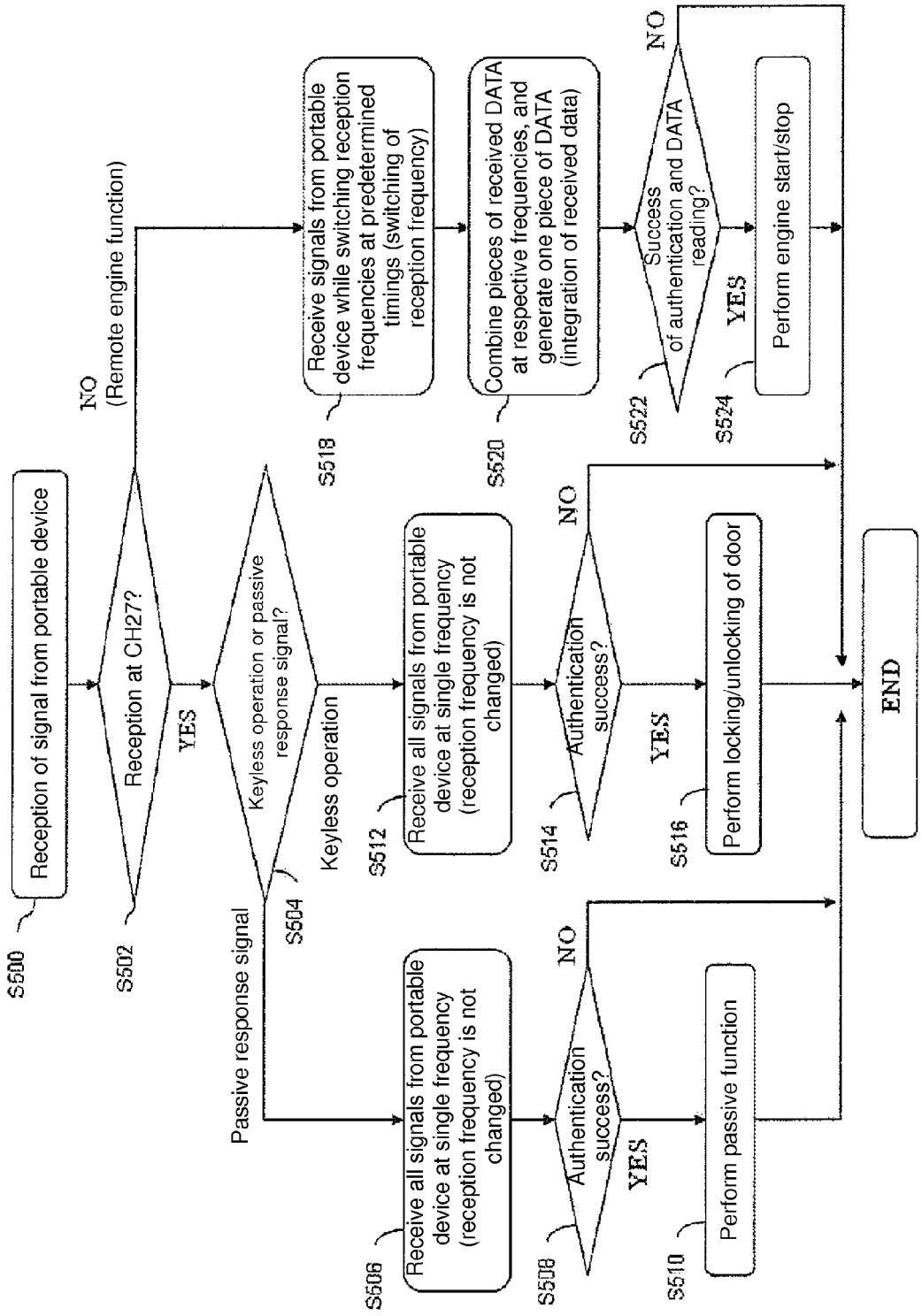
FIG. 17 is a flow chart showing a control step for reception standby by the control device of a vehicle of the third embodiment according to the disclosure.

Referring to FIGS. 16 and 17, a control system 100B of a third embodiment will be described. To avoid overlapping description, aspects different from those of an illustrative embodiment will be mainly described. The structure of the control system 100B is basically the same as that of the control system 100 described above. The control system 100B is different from the control system 100 in that a control device 20B performs reception standby at a plurality of frequencies. Also, the control system 100B is different from the control system 100A in that there is no shared frequency between the center frequency at which reception standby for a proximity control signal indicating the content of a command signal for the keyless function or a response signal for the passive function is performed and the plurality of center frequencies for receiving a remote control signal indicating the content of a command signal for the remote engine function.

The control device 20B performs reception standby at a plurality of center frequencies at which a remote control signal is to be transmitted and at a single center frequency, which is a frequency not included in the plurality of frequencies, at which a proximity control signal is to be transmitted. Specifically, in the case of the third embodiment, the control device 20B performs the first reception standby continuously at a single center frequency CH27 at which a proximity control signal is to be transmitted, and a center frequency CH1 at which the first divided signal of a remote control signal is to be transmitted. Then, following an intermission, the control device 20B performs the second reception standby continuously at CH27, and at CH2 for transmission of the second divided signal of the remote control signal, CH2 being a center frequency different from the single center frequency at which the proximity control signal is to be transmitted and different from the center frequency CH1 used at the time of transmission of the first divided signal of the remote control signal. Then, following further another intermission, the control device 20B performs the third reception standby continuously at CH27 and CH1 as at the time of the first reception standby. In this manner, the control device 20B performs reception standby for the proximity control signal at the single center frequency (CH27), and performs reception standby for all the divided signals of the remote control signal at a plurality of center frequencies including only the center frequencies (CH1 to CH26) different from the single center frequency.

The control device 20B waits for reception at the single center frequency (CH27) and frequencies (CH1, CH2) used only for the plurality of center frequencies. Then, in the case where a proximity control signal is received when the control device 20B is performing reception standby at the frequency CH27, since the center frequency CH27 is not used for transmission of the divided signals of a remote control signal, it is apparent that the received signal is a proximity control signal, and the state is shifted from the reception standby state to the reception processing state. In this case, there is no need to determine whether the received signal is a proximity control signal or a remote control signal based on the content of the signal. Thereafter, since the received signal is a proximity control signal, the control device 20B receives the entire proximity control signal at the single center frequency without switching the center frequency to be received.

On the other hand, in the case where the first or the second divided signal of a remote control signal is received when the control device 20B is performing reception standby at the frequency CH1 or CH2, it is apparent that the received signal is a remote control signal, and the state is shifted from the reception standby state to the reception processing state. In this case, there is no need to determine whether the received signal is a proximity control signal or a remote control signal based on the content of the signal. After shifting to the reception processing state, the control device 20B receives the following divided signals by switching to the center frequencies corresponding to the frequencies used at the time of transmission of the divided signals by the portable device. By such reception standby being performed, even if reception of the first divided signal is missed at CH1, for example, reception at CH2 is possible, and the probability of receiving the remote control signal is increased. Since the remote control signal is assumed to be transmitted from a far distance, the intensity of the reception signal is possibly low. Accordingly, by increasing the timings when reception is possible, the success probability of reception may be increased. Also, since there is no shared frequency between the center frequencies for transmitting the divided signals of a remote control signal and the single center frequency for transmitting a proximity control signal, there is no need to determine the content of a signal.

Referring to FIG. 17, the control step for reception standby by the control device 20B will be described. To avoid overlapping description, portions different from FIG. 15 will be mainly described. In S500, the control device 20B receives from the portable device 10B a proximity control signal for the keyless function or the passive function, or a remote control signal for the remote engine function. In S502, the control device 20B checks whether the signal has been received at the center frequency CH27 for the proximity control signal not included in the center frequencies for transmitting a plurality of divided signals of the remote control signal. If the result indicates that the signal has been received at other than the center frequency CH27, since the proximity control signal is not transmitted at other than the center frequency CH27, the control device 20B determines the remote control signal regarding the remote engine function. The following flow (S518 to S524) is the same as that of an illustrative embodiment.

In the case where a signal is received at the single center frequency CH27 for the proximity control signal, it is not clear whether the received proximity control signal includes the response signal for the passive function or the command signal for the keyless function. Accordingly, as in S302 and S304 described above, the control device 20B determines, in S504, based on the content information in the DATA portion containing the command content or the like of the received signal, whether the received signal is the command signal for the keyless function or the response signal for the passive function.

As a result, in the case where the received signal is a proximity control signal regarding the response signal for the passive function, the control device 20B performs S506 to S510 (corresponding to S306 to S310). Also, in the case where the received signal is a proximity control signal regarding the command signal for the keyless function, the control device 20B performs S512 to S516 (corresponding to S312 to S316). By performing such reception standby, the probability of receiving a remote control signal is increased.

<Fourth Embodiment>

Illustrative embodiments are one or more embodiments of the disclosure regarding a vehicle with an engine, but the disclosure is not restricted thereto. For example, the disclosure may be applied to an electric vehicle without an engine, to start/stop the air conditioner or the like from a distance.

According to a control system of an electric vehicle, a remote control signal for a remote turn-on function for an air conditioner for starting the air conditioner from a distance and for a remote turn-off function for an air conditioner for stopping the air conditioner, and a proximity control signal for the keyless entry function or the passive function are used. As in illustrative embodiments, the remote control signal is mainly transmitted from a portable device by dividing the whole of a command signal regarding the remote turn-on function for an air conditioner or the like into a plurality of pieces at a plurality of center frequencies of UHF waves in 900 MHz band and by performing frequency hopping. At the electric vehicle, the divided signals are received at center frequencies corresponding to the frequencies used at the time of transmission of the divided signals by the portable device, as in illustrative embodiments. In this manner, in the case of long-distance communication of transmitting/receiving a command signal for the remote turn-on function for an air conditioner or the like, by performing frequency hopping communication according to which the time of transmission at the same center frequency is made short by dividing the command content, the regulations in the U.S. may be satisfied even at the time of performing transmission/reception at high intensity.

As in illustrative embodiments, the proximity control signals for the keyless entry function and the passive function are transmitted/received at a single center frequency of UHF wave in 900 MHz band. The remote control signal is transmitted with higher transmission intensity than the proximity control signal. However, with the remote control signal, the regulations in each country may be complied with by transmitting the signal by using a plurality of center frequencies and by performing frequency hopping, and all of one piece of transmission data contained in a command signal for the remote engine start operation may be transmitted. An air conditioner is mainly described in the fourth embodiment as an example of an in-vehicle appliance to be controlled from a distance, but this is not restrictive. As a signal to be transmitted at high transmission intensity, a command signal for start or stop of charging of an electric vehicle, a signal for setting the time of start of charging, a signal for instructing a vehicle to notify of the charge state, and the like are conceivable.

The invention is not limited to the embodiments illustrated, and embodiment by a structure not departing from the scope of content described in each claim is possible. That is, the invention is illustrated and described mainly with respect to specific embodiments, but those skilled in the art may make various modifications to the embodiments described above in terms of quantities and other details without departing from the technical idea and the aim of the invention.

The invention claimed is:

1. A control system comprising:
    a portable device configured to transmit to a vehicle:
        a proximity control signal for controlling locking/unlocking of an opening/closing body of the vehicle from near the vehicle, and
        a remote control signal for controlling an engine of the vehicle from a far distance, intensity of the remote control signal being higher than that of the proximity control signal,
            wherein the far distance is in a range of several hundreds of meters to one kilometer; and
        a control device provided to the vehicle and configured to receive a signal that is transmitted by the portable device,
    wherein the portable device transmits by a same transmission antenna:
        a whole of the proximity control signal at a single center frequency, and
        all of divided signals obtained by dividing a whole of the remote control signal into a plurality of pieces at a plurality of center frequencies,
    wherein the control device receives by a same reception antenna:
        the whole of the proximity control signal at the single center frequency, and
        all of the divided signals at center frequencies corresponding to frequencies used at times of transmission of the divided signals by the portable device, and
    wherein the control device:
        waits for reception at the single center frequency,
        determines, based on content of a received signal, whether the received signal is the proximity control signal or a first divided signal of the remote control signal, and
        in a case where the received signal is the first divided signal of the remote control signal, performs reception by switching to a center frequency corresponding to a frequency used at a time of transmission of the divided signal by the portable device.

2. The control system according to claim 1, wherein the portable device performs transmission with the single center frequency for transmitting the proximity control signal and a center frequency for transmitting a first divided signal of the remote control signal being a same frequency.

3. A control system comprising:
    a portable device configured to transmit to a vehicle:
        a proximity control signal for controlling locking/unlocking of an opening/closing body of the vehicle from near the vehicle, and
        a remote control signal for controlling an engine of the vehicle from a far distance, intensity of the remote control signal being higher than that of the proximity control signal,
            wherein the far distance is in a range of several hundreds of meters to one kilometer; and
        a control device provided to the vehicle and configured to receive a signal that is transmitted by the portable device,
    wherein the portable device transmits by a same transmission antenna:
        a whole of the proximity control signal at a single center frequency, and
        all of divided signals obtained by dividing a whole of the remote control signal into a plurality of pieces at a plurality of center frequencies,
    wherein the control device receives by a same reception antenna:
        the whole of the proximity control signal at the single center frequency, and
        all of the divided signals at center frequencies corresponding to frequencies used at times of transmission of the divided signals by the portable device,
    wherein the portable device transmits the proximity control signal at the single center frequency, and all of the divided signals of the remote control signal at the plurality of center frequencies including a center frequency that is same as the single center frequency and a different center frequency, and
    wherein the control device:
        waits for reception at frequencies used only for the single center frequency and the plurality of center frequencies,
        in a case where a frequency of a received signal is a same frequency as a frequency used only for the plurality of center frequencies, performs reception by switching to a center frequency corresponding to a frequency used at a time of transmission of the divided signal by the portable device without determining, based on content of the received signal, whether the received signal is the proximity control signal or a first divided signal of the remote control signal, and in a case where the frequency of the received signal is a same frequency as the single center frequency, determines, based on content of the received signal, whether the received signal is the proximity control signal or the first divided signal of the remote control signal, and if the received signal is the first divided signal of the remote control signal, performs reception by switching to the center frequency corresponding to the frequency used at the time of transmission of the divided signal by the portable device.

4. A control system comprising:

a portable device configured to transmit to a vehicle:
   a proximity control signal for controlling locking/unlocking of an opening/closing body of the vehicle from near the vehicle, and
   a remote control signal for controlling an engine of the vehicle from a far distance, intensity of the remote control signal being higher than that of the proximity control signal,
      wherein the far distance is in a range of several hundreds of meters to one kilometer; and
   a control device provided to the vehicle and configured to receive a signal that is transmitted by the portable device,
wherein the portable device transmits by a same transmission antenna:
   a whole of the proximity control signal at a single center frequency, and
   all of the divided signals obtained by dividing a whole of the remote control signal into a plurality of pieces at a plurality of center frequencies, and
wherein the control device receives by a same reception antenna:
   the whole of the proximity control signal at the single center frequency, and
   all of the divided signals at center frequencies corresponding to frequencies used at times of transmission of the divided signals by the portable device,
wherein the portable device performs transmission with the single center frequency for transmitting the proximity control signal and center frequencies for transmitting all of a plurality of the divided signals of the remote control signal being different frequencies, and
wherein the control device:
   waits for reception at the single center frequency and a center frequency used for transmission of a divided signal of the remote control signal by the portable device, and
   in a case where a frequency of a received signal is same as a center frequency for transmitting a divided signal of the remote control signal, performs reception by switching to a center frequency corresponding to a frequency used at a time of transmission of the divided signal by the portable device without determining, based on content of the received signal, whether the received signal is the proximity control signal or a first divided signal of the remote control signal.

5. A portable device,
wherein the portable device is configured to transmit, to a vehicle:
   a proximity control signal for controlling locking and unlocking of an opening and closing body of the vehicle from near the vehicle, and
   a remote control signal for controlling an engine of the vehicle from a far distance, intensity of the remote control signal being higher than that of the proximity control signal,
      wherein the far distance is in a range of several hundreds of meters to one kilometer,
wherein the portable device is configured to transmit by a same transmission antenna:
   a whole of the proximity control signal at a single center frequency, and
   all of divided signals obtained by dividing a whole of the remote control signal into a plurality of pieces at a plurality of center frequencies, and
wherein the control device:
   waits for reception at the single center frequency,
   determines, based on content of a received signal, whether the received signal is the proximity control signal or a first divided signal of the remote control signal, and
   in a case where the received signal is the first divided signal of the remote control signal, performs reception by switching to a center frequency corresponding to a frequency used at a time of transmission of the divided signal by the portable device.

6. A control system comprising:

a portable device configured to transmit to a vehicle:
   a proximity control signal for controlling the vehicle from near the vehicle, and
   a remote control signal for controlling the vehicle from a far distance, intensity of the remote control signal being higher than that of the proximity control signal,
      wherein the far distance is in a range of several hundreds of meters to one kilometer; and
a control device provided to the vehicle and configured to receive a signal that is transmitted by the portable device,
wherein the portable device transmits by a same transmission antenna:
   a whole of the proximity control signal at a single center frequency, and
   all of divided signals obtained by dividing a whole of the remote control signal into a plurality of pieces at a plurality of center frequencies,
wherein the control device receives by a same reception antenna:
   the whole of the proximity control signal at the single center frequency, and
   all of the divided signals at center frequencies corresponding to frequencies used at times of transmission of the divided signals by the portable device, and
wherein the control device:
   waits for reception at the single center frequency,
   determines, based on content of a received signal, whether the received signal is the proximity control signal or a first divided signal of the remote control signal, and
   in a case where the received signal is the first divided signal of the remote control signal, performs reception by switching to a center frequency corresponding to a frequency used at a time of transmission of the divided signal by the portable device.

* * * * *